United States Patent
Seo et al.

(10) Patent No.: US 10,375,649 B2
(45) Date of Patent: Aug. 6, 2019

(54) METHOD AND APPARATUS FOR CONTROLLING TRANSMISSION POWER OF UPLINK CONTROL CHANNEL

(71) Applicant: LG ELECTRONICS INC., Seoul (KR)

(72) Inventors: Dong Youn Seo, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/241,760

(22) PCT Filed: Sep. 26, 2013

(86) PCT No.: PCT/KR2013/008641
§ 371 (c)(1),
(2) Date: Feb. 27, 2014

(87) PCT Pub. No.: WO2014/051361
PCT Pub. Date: Apr. 3, 2014

(65) Prior Publication Data
US 2015/0049682 A1 Feb. 19, 2015

Related U.S. Application Data

(60) Provisional application No. 61/706,092, filed on Sep. 26, 2012, provisional application No. 61/706,761, filed on Sep. 27, 2012.

(51) Int. Cl.
*H04W 4/00* (2018.01)
*H04W 52/14* (2009.01)
(Continued)

(52) U.S. Cl.
CPC ......... *H04W 52/146* (2013.01); *H04L 1/1861* (2013.01); *H04W 52/34* (2013.01);
(Continued)

(58) Field of Classification Search
CPC . H04W 52/18; H04W 52/325; H04W 52/247; H04W 52/42; H04W 52/146;
(Continued)

(56) References Cited

U.S. PATENT DOCUMENTS

2012/0155413 A1* 6/2012 Liu .................... H04L 1/1861
370/329
2013/0259011 A1* 10/2013 Nakashima ....... H04W 72/0473
370/336
(Continued)

FOREIGN PATENT DOCUMENTS

CN 101998539 A 3/2011
CN 102083181 A 6/2011
(Continued)

OTHER PUBLICATIONS

3GPP TS 36.331 V11.0.0 (Jun. 2012).*
(Continued)

*Primary Examiner* — Yemane Mesfin
*Assistant Examiner* — Abdelillah Elmejjarmi
(74) *Attorney, Agent, or Firm* — Dentons US LLP

(57) ABSTRACT

The present invention provides a method for controlling transmission power of an uplink control channel carried out by an user equipment in a wireless communication system and an user equipment using the method. The method comprises: receiving uplink power control information; and determining transmission power of an uplink control channel based on the uplink power control information, wherein the uplink power control information includes a power offset value determined according to whether transmit diversity is applied when the uplink control channel is transmitted through a channel selection scheme.

14 Claims, 13 Drawing Sheets

(51) Int. Cl.
*H04W 52/42* (2009.01)
*H04W 72/04* (2009.01)
*H04W 52/34* (2009.01)
*H04L 1/18* (2006.01)
*H04L 5/00* (2006.01)

(52) U.S. Cl.
CPC ....... *H04W 52/42* (2013.01); *H04W 72/0413* (2013.01); *H04L 5/001* (2013.01); *H04L 5/0055* (2013.01)

(58) Field of Classification Search
CPC .. H04W 72/0413; H04W 52/32; H04L 5/0055
See application file for complete search history.

(56) References Cited

U.S. PATENT DOCUMENTS

| | | | | |
|---|---|---|---|---|
| 2014/0022994 | A1* | 1/2014 | Pan | H04W 52/146 370/328 |
| 2014/0329555 | A1* | 11/2014 | Gao | H04W 52/146 455/522 |

FOREIGN PATENT DOCUMENTS

| | | | | |
|---|---|---|---|---|
| CN | 102160431 A | 8/2011 | | |
| CN | 102208968 A | 10/2011 | | |
| CN | 102573030 A | * | 7/2012 | ............ H04W 52/14 |
| CN | 102573030 A | 7/2012 | | |
| EP | 2334124 A1 | 6/2011 | | |
| EP | 2469921 A1 | 6/2012 | | |
| EP | 2696628 A1 | 2/2014 | | |
| EP | 2790446 A1 | 10/2014 | | |
| JP | WO2012077667 A1 | * | 6/2012 | ............ H04W 52/48 |
| KR | 2011-0090783 A | 8/2011 | | |
| KR | 2012-0070345 A | 6/2012 | | |
| KR | 2012-0091960 A | 8/2012 | | |
| KR | 1020130098395 A | 9/2013 | | |
| WO | 2011/120411 A1 | 10/2011 | | |
| WO | WO2012062208 A1 | * | 5/2012 | ............ H04W 52/02 |

OTHER PUBLICATIONS

ETSI TS 136 331 V11.4.0 (Jul. 2013).*
"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 24, 2012).
"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.2.0 (Dec. 19, 2012).

* cited by examiner

United States Patent US 10,375,649 B2

METHOD AND APPARATUS FOR CONTROLLING TRANSMISSION POWER OF UPLINK CONTROL CHANNEL

This application is a 35 USC § 371 National Stage entry of International Application No. PCT/KR2013/008641, filed Sep. 26, 2013, and claims priority to U.S. Provisional Application Nos. 61/706,092, filed Sep. 26, 2012 and 61/706,761, filed Sep. 27, 2012, each of which are hereby incorporated by reference in its entirety.

BACKGROUND OF THE INVENTION

Field of the Invention

The present invention relates to wireless communication and more particularly, a method for controlling transmission power of uplink control channel and an apparatus using the method.

Related Art

LTE (Long Term Evolution) is a standard for mobile communication and it is based on the 3GPP ($3^{rd}$ Generation Partnership Project) TS (Technical Specification) Release 8. LTE-A (Advanced) is a mobile communication standard representing a major enhancement of the LTE.

In the LTE system, ACK/NACK (acknowledgement/negative acknowledgement), which is used for checking reception of downlink data, can be transmitted through an uplink control channel. An uplink control channel supports several formats for this purpose.

Transmit Diversity (TxD) is one of techniques for transmitting ACK/NACK. Transmit diversity is the technique that transmits identical information through antenna ports different from each other. SORTD (Spatially Orthogonal Resource Transmit Diversity) is one implementation of TxD. SORTD is a technique that transmits identical information by using resources orthogonal to each other among different antenna ports.

ACK/NACK can also be transmitted by channel selection. Channel selection is a technique for representing ACK/NACK state by using resources selected from among a plurality of resources and a combination of modulation symbols transmitted through the selected resources.

Meanwhile, the LTE system determines transmission power of an uplink control channel when ACK/NACK is transmitted through the uplink control channel. Power offset values are determined differently for the respective formats of the uplink control channel depending on whether transmit diversity is applied for the corresponding format. When channel selection is employed for ACK/NACK transmission, transmit diversity is not taken into consideration. Therefore, the LTE system does not define a power offset value for the case where transmit diversity is applied for channel selection.

On the other hand, the LTE-A is considering applying transmit diversity for channel selection. Therefore, how to determine the power offset value for an uplink control channel turns into a problem for the case where channel selection and transmit diversity are both applied to the uplink control channel.

SUMMARY OF THE INVENTION

The present invention has been made in an effort to provide a method for controlling transmission power of an uplink control channel and an apparatus using the method.

One aspect of the present invention provides a method for controlling transmission power of an uplink control channel carried out by an user equipment in a wireless communication system. The method receives uplink power control information and based on the uplink power control information, determines transmission power of an uplink control channel, where the uplink power control information includes a power offset value determined according to whether transmit diversity is applied when the uplink control channel is transmitted through a channel selection technique.

An user equipment according to another aspect of the present invention comprises an RF (Radio Frequency) unit transmitting and receiving wireless signals; and a processor connected to the RF unit, where the RF unit receives uplink power control information and based on the uplink power control information, determines transmission power of an uplink control channel and the uplink power control information includes a power offset value that is determined when the uplink control channel is transmitted through a channel selection technique according to whether transmit diversity is applied.

A method for uplink control channel transmission carried out by an user equipment in a wireless communication system according to a yet another aspect of the present invention receives uplink power control information; determines transmission power of an uplink control channel based on the uplink power control information; and transmits ACK/NACK (acknowledgement/negative acknowledgement) through the uplink control channel by the determined transmission power, where the ACK/NACK transmission uses transmit diversity with channel selection only when the user equipment supports aggregation of two or more cells.

According to the present invention, transmission power of an uplink control channel is determined efficiently. More particularly, for the case where transmit diversity is used for channel selection, transmission power of an uplink control channel is determined efficiently

DESCRIPTION OF EXEMPLARY EMBODIMENTS

An user equipment (UE) may be fixed or mobile and can be referred to by other names such as mobile station (MS), mobile terminal (MT), user terminal (UT), subscriber station (SS), wireless device, personal digital assistant (PDA), wireless modem, handheld device, or the like.

A base station usually refers to a fixed station communicating with the user equipment and can be termed differently as evolved-NodeB (eNB), base transceiver system (BTS), access point, and so on.

Figure 1:
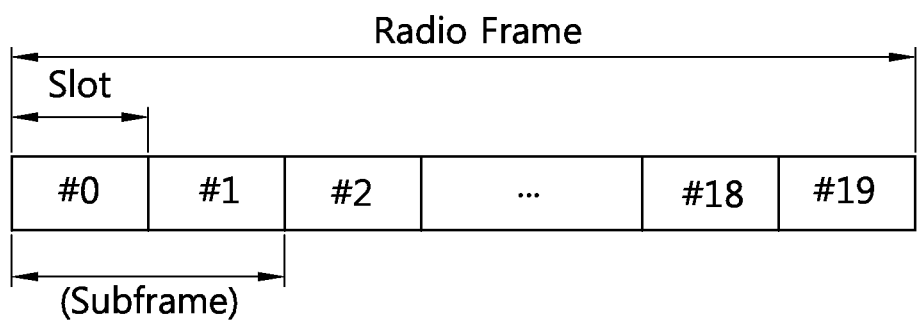
FIG. 1 illustrates the structure of a FDD (Frequency Division Duplex) radio frame in the 3GPP LTE.

FIG. 1 illustrates the structure of a FDD (Frequency Division Duplex) radio frame in the 3GPP LTE. Section 4 of 3GPP TS 36.211 v8.7.0 (2009-05) "Evolved Universal Terrestrial Radio Access (E-UTRA): Physical Channels and Modulation (Release 8)" defines the structure of the FDD radio frame.

The radio frame is comprised of ten subframes indexed by 0 to 9. One subframe is comprised of two consecutive slots. A time required for transmitting one subframe is called TTI (transmission time interval). For example, the length of one subframe may be 1 ms and the length of one slot may be 0.5 ms.

Figure 2:
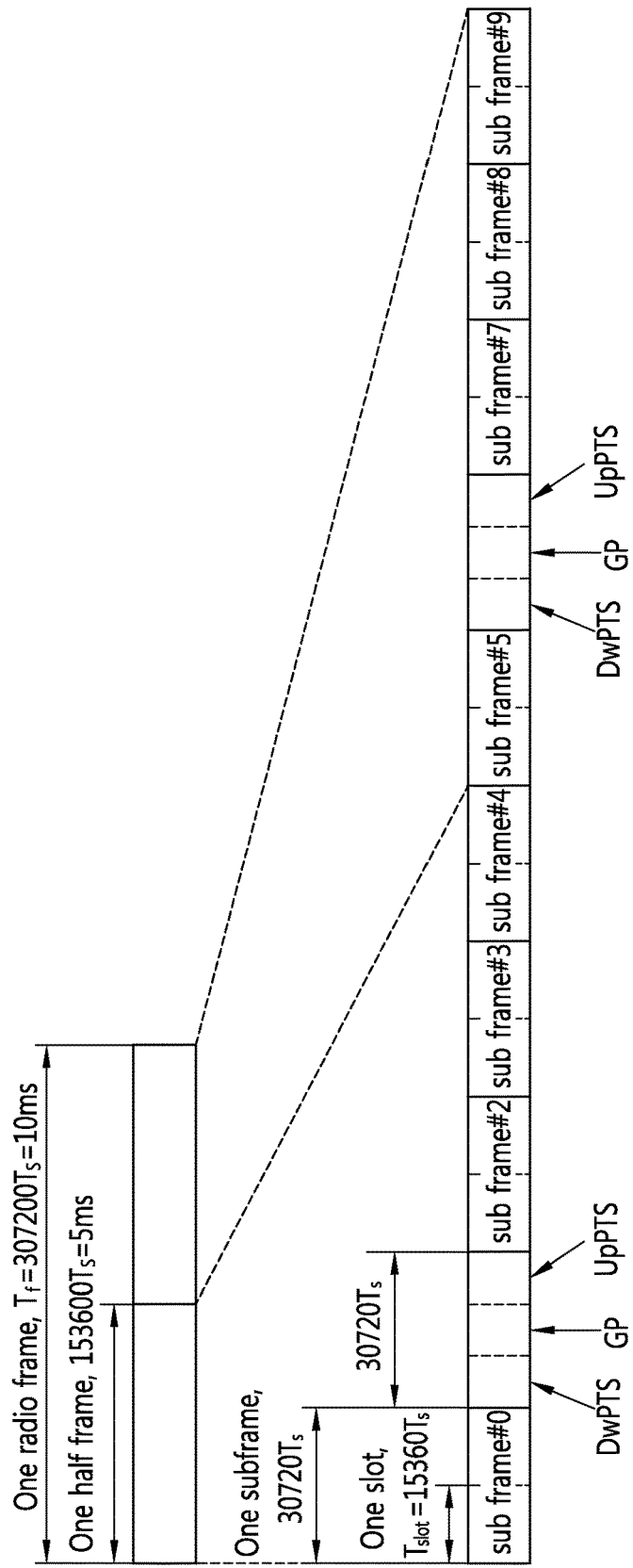
FIG. 2 illustrates the structure of a TDD (Time Division Duplex) radio frame in the 3GPP LTE.

FIG. 2 illustrates the structure of a TDD (Time Division Duplex) radio frame in the 3GPP LTE.

A downlink (DL) subframe, a uplink (UL) subframe, and a special subframe can be defined together in a TDD radio frame.

Table 1 is one example of uplink and downlink (UL-DL) configuration in a radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table, 'D' stands for DL subframe; 'U' stands for UL subframe; and 'S' stands for special sbuframe. If UL-DL configuration is received from a base station, an user equipment can know which subframe corresponds to DL or UL subframe depending on configuration of radio frames.

A subframe indexed by 1 or 6 is a special subframe and includes DwPTS (Downlink Pilot Time Slot), GP (Guard Period), and UpPTS (Uplink Pilot Time Slot). DwPTS is used for initial cell search, synchronization, or channel estimation in an user equipment. UpPTS is used for channel estimation and synchronization of uplink transmission of a user terminal in a base station. GP corresponds to an interval meant for removing interference generated in a uplink due to multi-path delay of a downlink signal between the uplink and a downlink.

Figure 3:
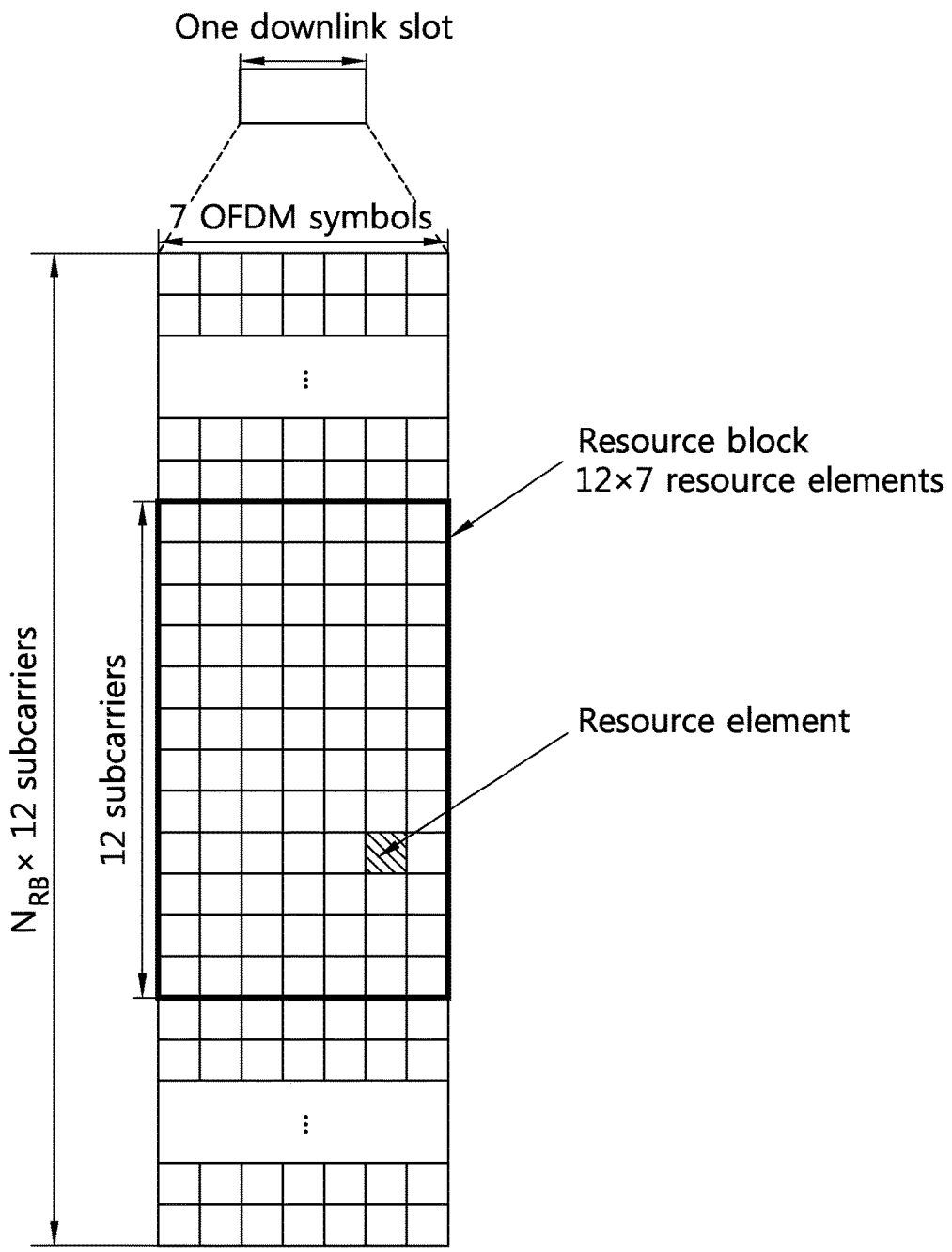
FIG. 3 is one example of a resource grid for one downlink slot.

FIG. 3 is one example of a resource grid for one downlink slot.

With reference to FIG. 3, a downlink slot comprises a plurality of OFDM symbols in the time domain and $N_{RB}$ resource blocks (RBs) in the frequency domain. A resource block is a basis unit for resource allocation and includes one slot in the time domain and a plurality of consecutive subcarriers in the frequency domain. The number of resource blocks $N_{RB}$ included in the downlink slot depends on the downlink transmission bandwidth set up within a cell. For example, in the LTE system, $N_{RB}$ can assume any value ranging from 6 to 110. The structure of an uplink slot can be the same as that of the downlink slot.

Each element of the resource grid is called a resource element (RE). Each resource element of the resource grid can be referenced by an index pair (k, l) within the corresponding slot. Here, K (K=0, ..., $N_{RB}$ X 12-1) represents a subcarrier index within the frequency domain while l (l=0, ..., 6) represents OFDM symbol index within the time domain.

In the example of FIG. 3, it is assumed that one resource block is comprised of 7 OFDM symbols in the time domain and 12 subcarriers in the frequency domain, including 7×12 resource elements in total; however, the number of OFDM symbols and the number of subcarriers within a resource block are not limited to the above example. In a normal CP, one slot may include 7 OFDM symbols while one slot in an extended CP may include 6 OFDM symbols. The number of OFDM symbols and the number of subcarriers can change in various ways according to the length of CP, frequency spacing, and so on. The number of subcarriers for one OFDM symbol can take the value from among 128, 256, 512, 1024, 1536, and 2048.

Figure 4:
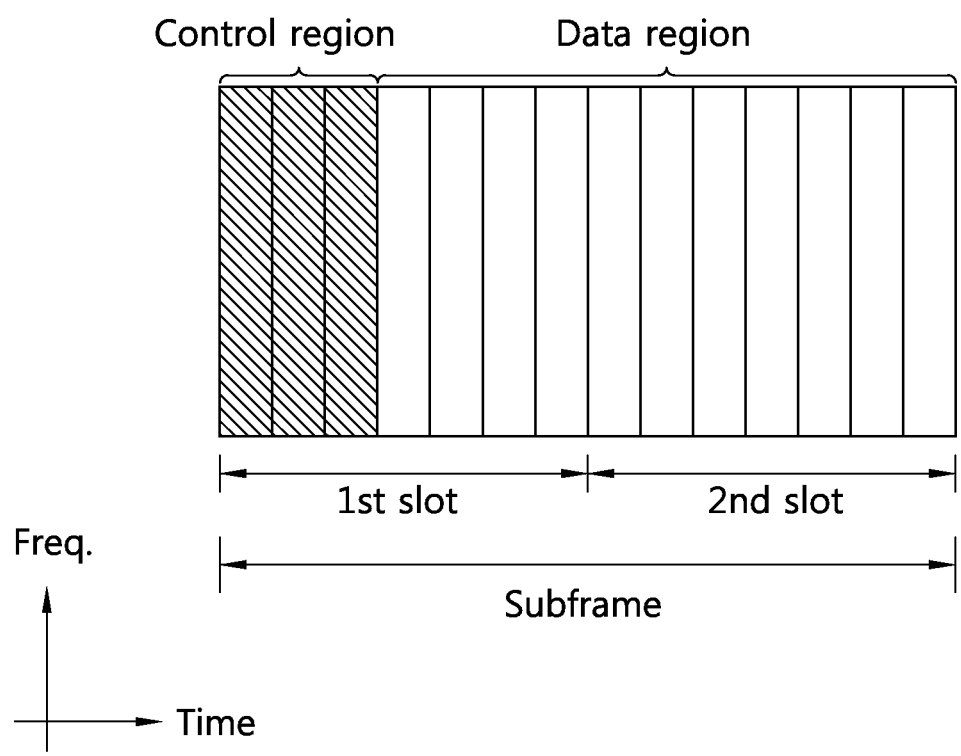
FIG. 4 illustrates a downlink subframe.

FIG. 4 illustrates a downlink subframe.

A downlink (DL) subframe is divided into a control region and a data region in the time domain. The control region includes a maximum of four leading OFDM symbols in a first slot within the subframe but the number of OFDM symbols included in the control region can be changed. PDCCH (Physical Downlink Control Channel) and other control channels are allocated to the control region while PDSCH is allocated to the data region.

As disclosed in the 3GPP TS 36.211 V10.2.0, physical control channels in the 3GPP LTE/LTE-A include PDCCH (Physical Downlink Control Channel), PCFICH (Physical Control Format Indicator Channel), and PHICH (Physical Hybrid-ARQ Indicator Channel).

PCFICH, which is mapped to the first OFDM symbol of the subframe, carries CFI (Control Format Indicator) related to the number of OFDM symbols used for transmission of control channels within the subframe. A wireless device first receives CFI through the PCFICH and monitors the PDCCH.

Different from the PDCCH, the PCFICH does not use blind decoding and is transmitted through fixed PCFICH resources of the subframe.

PHICH carries an ACK (positive acknowledgement)/NACK (negative acknowledgement) signal used for an uplink (UL) HARQ (Hybrid Automatic Repeat Request) process. The ACK/NACK signal, associated with UP data transmission performed through PUSCH by a wireless device, is transmitted through the PHICH.

PBCH (Physical Broadcast Channel) is transmitted by four leading OFDM symbols of the second slot in the first subframe of a radio frame. The PBCH carries system information essential for a wireless device to communicate with a base station. The system information transmitted through the PBCH is called MIB (Master Information Block). Meanwhile, the system information transmitted through the PDSCH, designated by the PDCCH, is called SIB (System Information Block).

The control information carried through the PDCCH is called downlink control information (DCI). The DCI can include resource allocation of the PDSCH (which is also called DL grant), resource allocation of PUSCH (which is also called UL grant), and a set of transmission power control commands for individual UEs within an arbitrary UE group and/or activation of VoIP (Voice over Internet Protocol).

Transmission of DL transmission blocks in the 3GPP LTE/LTE-A is carried out by a pair of PDCCH and PDSCH. Transmission of UL transmission blocks is carried out by a pair of PDCCH and PUSCH. For example, a wireless device receives DL transmission blocks through the PDSCH which is designated by the PDCCH. The wireless device monitors the PDCCH in the DL subframe and receives DL resource allocation through the PDCCH. The wireless device received DL transmission blocks through the PDSCH which is designated by the DL resource allocation.

A base station determines the PDCCH format according to the DCI to be sent to the wireless device and attaches CRC (Cyclic Redundancy Check) bits to the DCI and masks a unique identifier (which is called an RNTI (Radio Network Temporary Identifier)) in the CRC bits according to the owner or intended use of the PDCCH.

In the case of PDCCH intended for a particular wireless device, a unique identifier of the wireless device (for example, C-RNTI (Cell-RNTI)) can be masked in the CRC bits. Similarly, in the case of PDCCH intended for a paging message, a paging indication identifier (for example, P-RNTI (Paging-RNTI)) can be masked in the CRC bits. Also, in the case of PDCCH intended for system information, system information identifier, namely, SI-RNTI (System Information-RNTI) can be masked in the CRC bits. To indicate a random access response corresponding to transmission of random access preambles, RA-RNTI (Random Access-RNTI) can be masked in the CRC bits. To indicate a TPC (Transmit Power Control) command meant for a plurality of wireless devices, TPC-RNTI can be masked in the CRC bits. For the PDCCH meant for semi-persistent scheduling (SPS), SPS-C-RNTI can be masked in the CRC bits.

If C-RNTI is employed, the PDCCH carries corresponding control information for a particular wireless device (which is called UE-specific control information) whereas, if different RNTI is employed, the PDCCH carries common control information received by the whole or a plurality of wireless devices within a cell.

Coded data is generated by encoding CRC-added DCI. The encoding uses channel encoding and rate matching. The coded data is modulated to generate modulated symbols. The modulated symbols are mapped to physical resource elements (Res).

The control region within the subframe includes a plurality of CCEs (Control Channel Elements). The CCE is a logical allocation unit used for providing an encoding rate according to the conditions of a wireless channel and corresponds to a plurality of REGs (Resource Element Groups). An REG includes a plurality of resource elements. According to a relationship between the number of CCEs and the encoding rate provided by the CCEs, format of the PDCCH and the number of available bits of the PDCCH are determined.

One REG comprises four REs and one CCE comprises nine REGs. To establish a single PDCCH, $\{1, 2, 4, 8\}$ CCEs can be used, where the individual $\{1, 2, 4, 8\}$ elements is called CCE aggregation level.

The base station determines the number of CCEs used for transmission of PDDCH by considering channel conditions. For example, a single CCE may be sufficient for PDCCH transmission for a wireless device in a superior downlink channel condition. For a wireless device in a poor downlink channel condition, eight CCEs may be used for PDCCH transmission.

A control channel comprised of one or more CCEs performs interleaving in units of REGs and is mapped to physical resources after cyclic shift based on cell identifiers is carried out.

Figure 5:
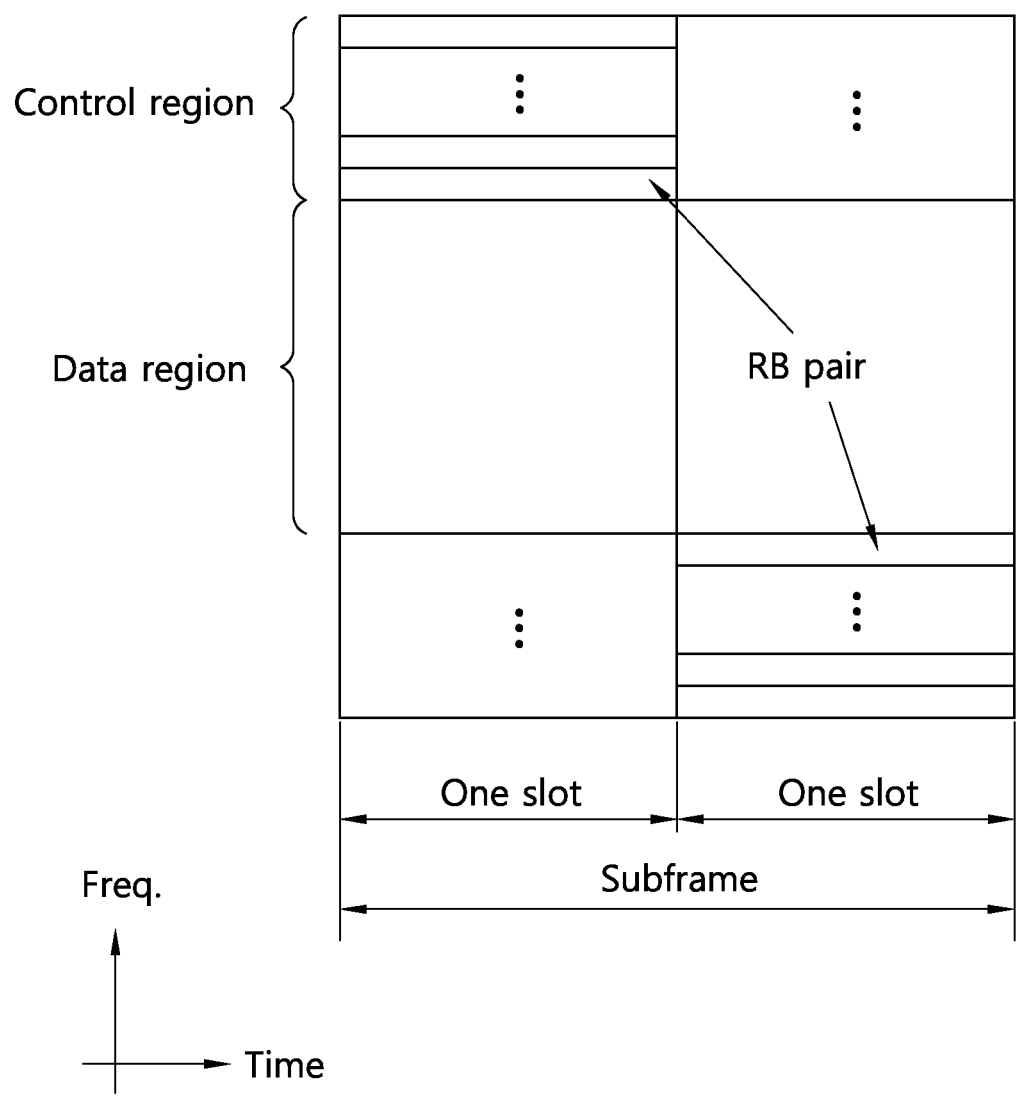
FIG. 5 illustrates the structure of an uplink subframe.

FIG. 5 illustrates the structure of an uplink subframe.

With reference to FIG. 5, an uplink subframe can be divided into a control region and a data region in the frequency domain. PUCCH (Physical Uplink Control Channel) through which uplink control information is transmitted is allocated in the control region. PUSCH (Physical Uplink Shared Channel) through which data (along with control information in some cases) is transmitted is allocated in the data region. Depending on the configuration, the UE can transmit the PUCCH and the PUSCH at the same time or only either of the two.

For the case of one UE, the PUCCH is allocated as an RB pair in the subframe. Resource blocks belonging to the resource block pair occupy different subcarriers from each other in each of a first and a second slot. Frequencies occupied by resource blocks belonging to the resource block pair allocated to the PUCCH are changed based on slot boundaries. This is referred to as frequency hopping of an RB pair allocated to the PUCCH at a slot boundary. As uplink control information is transmitted through subcarriers different with time, frequency diversity gain can be obtained.

HARQ (Hybrid Automatic Repeat reQuest), ACK (Acknowledgement)/NACK (Negative acknowledgement), and channel status information (CSI) representing the state of a downlink channel can be transmitted through the PUCCH.

Various formats are defined for the PUCCH to support transmission of various types of control information. The PUCCH format 1 carries scheduling requests (SRs). For this purpose, OOK (On-Off Keying) method can be employed. The PUCCH format 1a carries ACK/NACK (Acknowledgement/Negative acknowledgement) messages modulated according to BPSK (Binary Phase Shift Keying) technique for each codeword. The PUCCH format 1b carries ACK/NACK messages modulated according to QPSK (Quadrature Phase Shift Keying) technique for two codewords. The PUCCH format 2 carries CQI (Channel Quality Indicator) modulated according to QPSK technique. The PUCCH format 2a and 2b carry CQI and ACK/NACK messages.

The PUCCH format can be distinguished from each other according to the modulation technique employed and the number of bits within the subframe. Table 2 represents modulation techniques and the number of bits within the subframe according to the PUCCH format.

TABLE 2

| PUCCH format | Modulation scheme | number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

All of the PUCCH formats employ cyclic shift (CS) of a sequence for each OFDM symbol. A cyclically shifted sequence is generated by shifting a base sequence cyclically by a particular cyclic shift amount. The particular CS amount is specified by CS index.

One example of defining a base sequence $r_u(n)$ is shown in the following.

$$r_u(n)=e^{jb(n)\pi/4}. \quad [\text{Eq. 1}]$$

where u is a root index; n is an element index, $0 \leq n \leq N-1$; N is the length of the base sequence. Section 5.5 of the 3GPP TS 36.211 V8.7.0 defines the b(n).

The length of a sequence is the same as the number of elements included in the sequence. u can be determined by the cell ID (identifier), a slot number within a radio frame, and so on. Provided that the base sequence is mapped to one resource block in the frequency domain, the length N of the base sequence becomes 12 since one resource block comprises 12 subcarriers. A different base sequence can be defined if a different root index is utilized.

A cyclically shifted sequence $r(n, I_{cs})$ can be generated by cyclically shifting the base sequence r(n) as shown in Eq. (2).

$$r(n, I_{cs}) = r(n) \cdot \exp\left(\frac{j2\pi I_{cs} n}{N}\right), \quad [\text{Eq. 2}]$$
$$0 \leq I_{cs} \leq N - 1,$$

where $I_{cs}$ is a cyclic shift index, representing the amount of CS to be made ($0 \leq I_{cs} \leq N-1$).

The available cyclic shift index of the base sequence refers to the cyclic shift index derived from the base sequence according to CS intervals. For example, if the length of the base sequence is 12 and the CS interval is 1, the total number of available cyclic shift index of the base sequence becomes 12. Similarly, if the length of the base sequence is 12 and the CS interval is 2, the total number of available cyclic shift index of the base sequence is 6.

Figure 6:
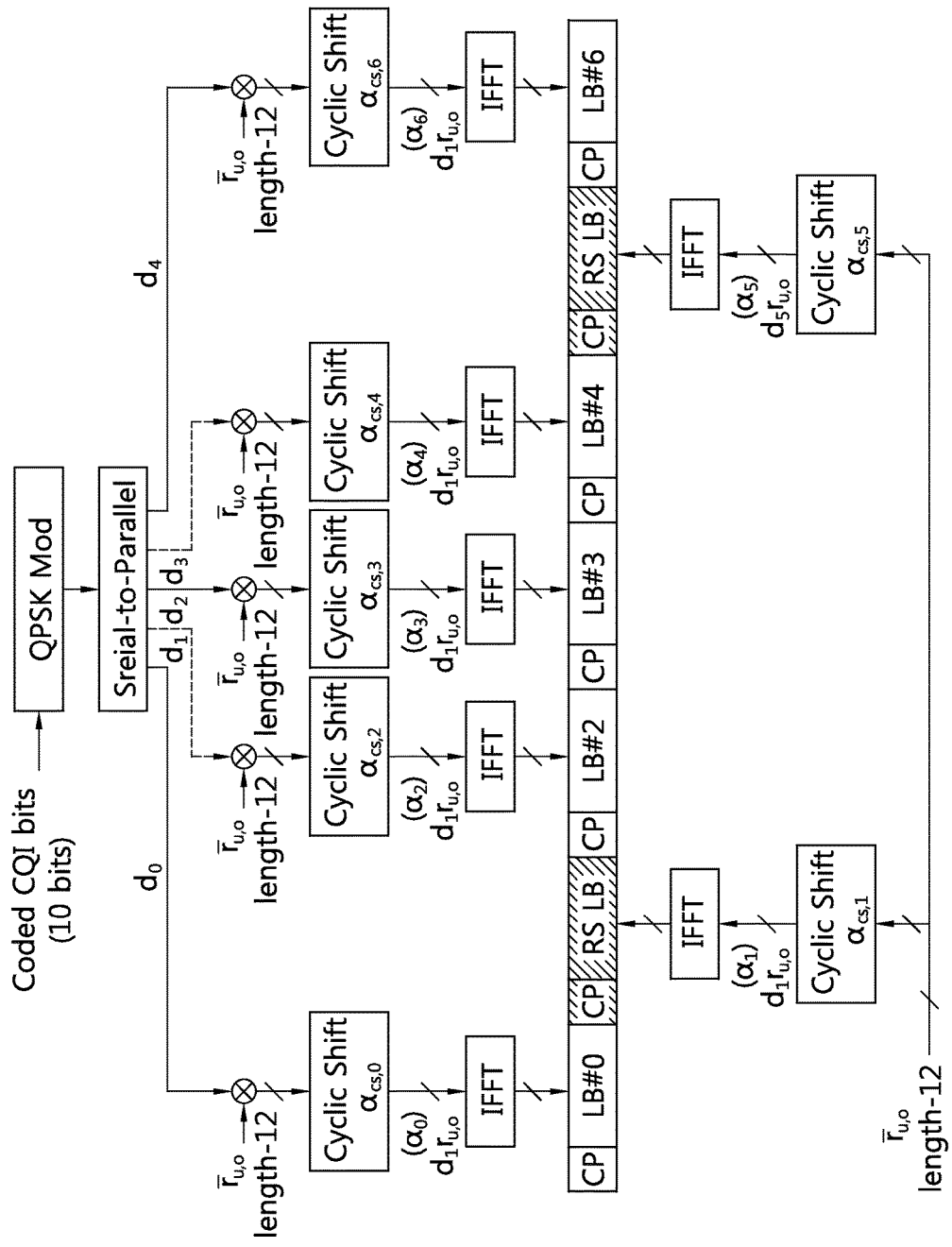
FIG. 6 illustrates the channel structure of PUCCH format 2/2a/2b for one slot in a normal CP.

FIG. 6 illustrates the channel structure of PUCCH format 2/2a/2b for one slot in a normal CP. As described earlier, the PUCCH format 2/2a/2b is used for transmission of CQI.

With reference to FIG. 6, the SC-FDMA symbol 1, 5 is used for demodulation reference symbol, which is an uplink reference signal in the normal CP. In the case of an extended CP, SC-FDMA (Single Carrier-Frequency Division Multiple Access) symbol 3 is used for the DM RS.

Channel coding with a one-half ratio, for example, can be applied to 10 CQI information bits, generating 20 coded bits. For channel coding, Reed-Muller (RM) code can be employed. Then scrambling (similar to the case where PUSCH data is scrambled into a gold sequence of length 31) and QPSK constellation mapping is applied to the channel coded information bits, generating QPSK modulation symbols. ($d_0$ to $d_4$ in the slot 0). Each QPSK modulation symbol is modulated into a cyclic shift of the base RS sequence having the length of 12; OFDM modulation is applied to the cyclically shifted sequence and the OFDM modulated sequence is transmitted from each of 10 SC-FDMA symbols within the subframe. The 12 cyclic shifts evenly separated from each other are made to be multiplexed orthogonally by 12 different UEs in the same PUCCH resource block. For the DM RS sequence applied for the SC-FDMA symbol 1 and 5, the base sequence with the length of 12 can be used.

Figure 7:
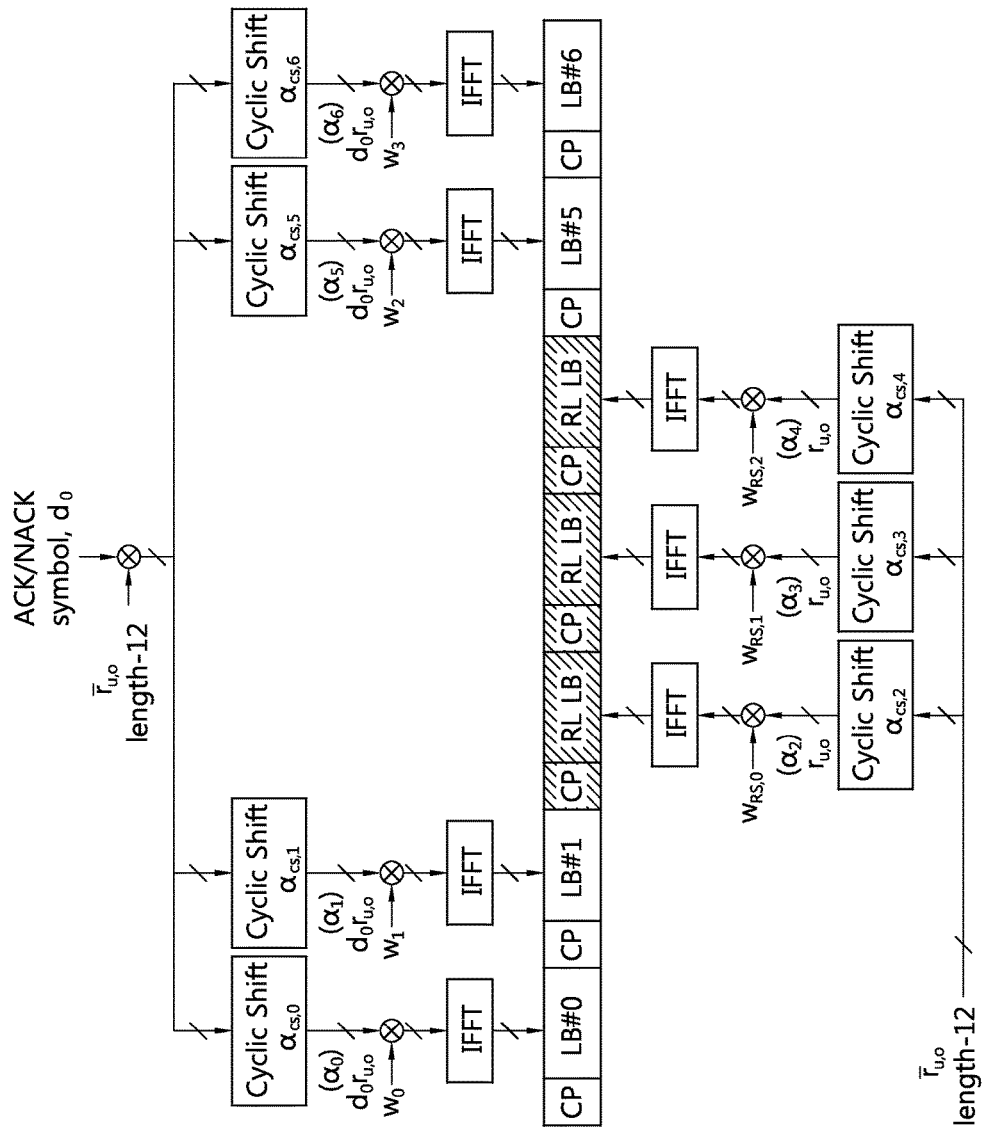
FIG. 7 illustrates PUCCH format 1a/1b for one slot in a normal CP.

FIG. 7 illustrates PUCCH format 1a/1b for one slot in a normal CP. An uplink reference signal is transmitted from the third to fifth SC-FDMA symbol. As shown in FIG. 7, $w_0$, $w_1$, $w_2$, and $w_3$ can be modulated in the time domain after IFFT (Inverse Fast Fourier Transform) modulation or can be modulated in the frequency domain before IFFT modulation.

One slot includes seven OFDM symbols and three OFDM symbols function as an RS (Reference Signal) OFDM symbol for a reference signal while four OFDM symbols become a data OFDM symbol for ACK/NACK signals.

In the PUCCH format 1b, the encoded two-bit ACK/NACK signal is QPSK (Quadrature Phase Shift Keying) modulated and a modulation symbol d(0) is generated.

The cyclic shift index $I_{CS}$ can vary according to the slot number ($n_s$) within a radio frame and/or the symbol index 1 within the slot.

Now that four data OFDM symbols are assigned for transmission of ACK/NACK signal in one slot of the normal CP, the corresponding cyclic shift indices in each data OFDM symbol are denoted as $I_{cs0}$, $I_{cs1}$, $I_{cs2}$, and $I_{cs3}$.

The modulation symbol d(0) is spread to the cyclically shifted sequence $r(n, I_{cs})$. Suppose a one-dimensional spread sequence corresponding to the (i+1)-th OFDM symbol in the slot is denoted as m(i).

Then the sequence m(i) can be represented as {m(0), m(1), m(2), m(3)}={d(0)r(n, $I_{cs0}$), d(0)r(n, $I_{cs1}$), d(0)r(n, $I_{cs2}$), d(0)r(n, $I_{cs3}$)}.

To increase the capacity of the UE, the one-dimensional spread sequence can be further diffused by using an orthogonal sequence. For an orthogonal sequence $w_i(k)$ (i is a sequence index and $0 \leq k \leq K-1$) where spreading factor K is 4, the following sequence is employed.

TABLE 3

| Index (i) | [$w_i(0)$, $w_i(1)$, $w_i(2)$, $w_i(3)$] |
| --- | --- |
| 0 | [+1, +1, +1, +1] |
| 1 | [+1, −1, +1, −1] |
| 2 | [+1, −1, −1, +1] |

For an orthogonal sequence $w_i(k)$ (i is a sequence index and $0 \leq k \leq K-1$) where spreading factor K is 3, the following sequence is employed.

TABLE 4

| Index (i) | [$w_i(0)$, $w_i(1)$, $w_i(2)$] |
| --- | --- |
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

The spreading factor can be defined differently for each slot.

Therefore, given an arbitrary orthogonal sequence index i, a two-dimensional spread sequence {s(0), s(1), s(2), s(3)} can be represented as follows.

$$\{s(0),s(1),s(2),s(3)\}=\{w_i(0)m(0),w_i(1)m(1),w_i(2)m(2),w_i(3)m(3)\}$$

The two-dimensional spread sequence {s(0), s(1), s(2), s(3)} is transmitted from the corresponding OFDM symbol after IFFT is performed. Thus, ACK/NACK signal is transmitted through the PUCCH.

The reference signal of the PUCCH format 1b is also transmitted by cyclically shifting the base sequence r(n) and spreading it to an orthogonal sequence. If it is assumed that the cyclic shift indices corresponding to the three RS OFDM symbols are $I_{cs4}$, $I_{cs5}$, and $I_{cs6}$, three cyclically shifted sequences $r(n, I_{cs4})$, $r(n, I_{cs5})$, and $r(n, I_{cs6})$ are obtained. The three cyclically shifted sequences are spread to an orthogonal sequence of $w_{RS,i}(k)$, where k=3.

The orthogonal sequence index i, cyclic shift index $I_{cs}$, and resource block index m are those parameters required to construct the PUCCH and at the same time, the parameters are resources used for identifying the PUCCH (or the UE). If the number of available cyclic shifts is 12 and the number of available orthogonal sequence indices is 3, the PUCCH associated with a total of 36 UEs can be multiplexed with a single resource block.

In the 3GPP LTE system, resource index $n^{(1)}{}_{PUCCH}$ is defined for obtaining the three parameters used for the UE to construct the PUCCH. The resource index is defined as $n^{(1)}{}_{PUCCH} = n_{CCE} N^{(1)}{}_{PUCCH}$, where $n_{CCE}$ is an index of the first CCE (the CCE having the smallest index) used for transmission of the corresponding DCI (that is, downlink resource allocation used for receiving downlink data corresponding to the ACK/NACK signal) and $N^{(1)}{}_{PUCCH}$ is a parameter notified to the UE by the base station in the form of a higher layer message.

The time, frequency, and code resources used for transmission of ACK/NACK signals are called ACK/NACK resources or PUCCH resources. As described above, the index (which is called ACK/NACK resource index or PUCCH index) of ACK/NACK resources required for transmit the ACK/NACK signal through the PUCCH can be represented by at least one of orthogonal sequence index i, cyclic shift index $I_{cs}$, resource block index m, and index for deriving the three indices. The ACK/NACK resources can include at least one of the orthogonal sequence, cyclic shift, resource block, and a combination thereof.

Meanwhile, the LTE-A system adopts the PUCCH format 3 to support transmission of much more ACK/NACK bits. For the case of FDD in the PUCCH format 3, a maximum of 10 bits can be transmitted for the ACK/NACK signal while a maximum of 20 bits can be transmitted for the case of TDD. Similarly, for the case of FDD in the PUCCH format 3, 11 bits consisting of 10 bits of ACK/NACK signal and one bit of SR (positive/negative) can be transmitted while for the case of TDD, 21 bits consisting of 20 bits of ACK/NACK signal and one bit of SR (positive/negative) can be transmitted. The PUCCH format 3 uses QPSK for modulation and the number of bits that can be transmitted in the subframe is 48 (which is the number of bits transmitted after information bits are channel coded).

The PUCCH format 3 performs block spreading-based transmission. In other words, the PUCCH format 3 spreads a modulation symbol sequence, which is a multi-bit ACK/NACK signal modulated by using block spreading code, in the time domain and transmits the spread modulation symbol sequence.

Figure 8:
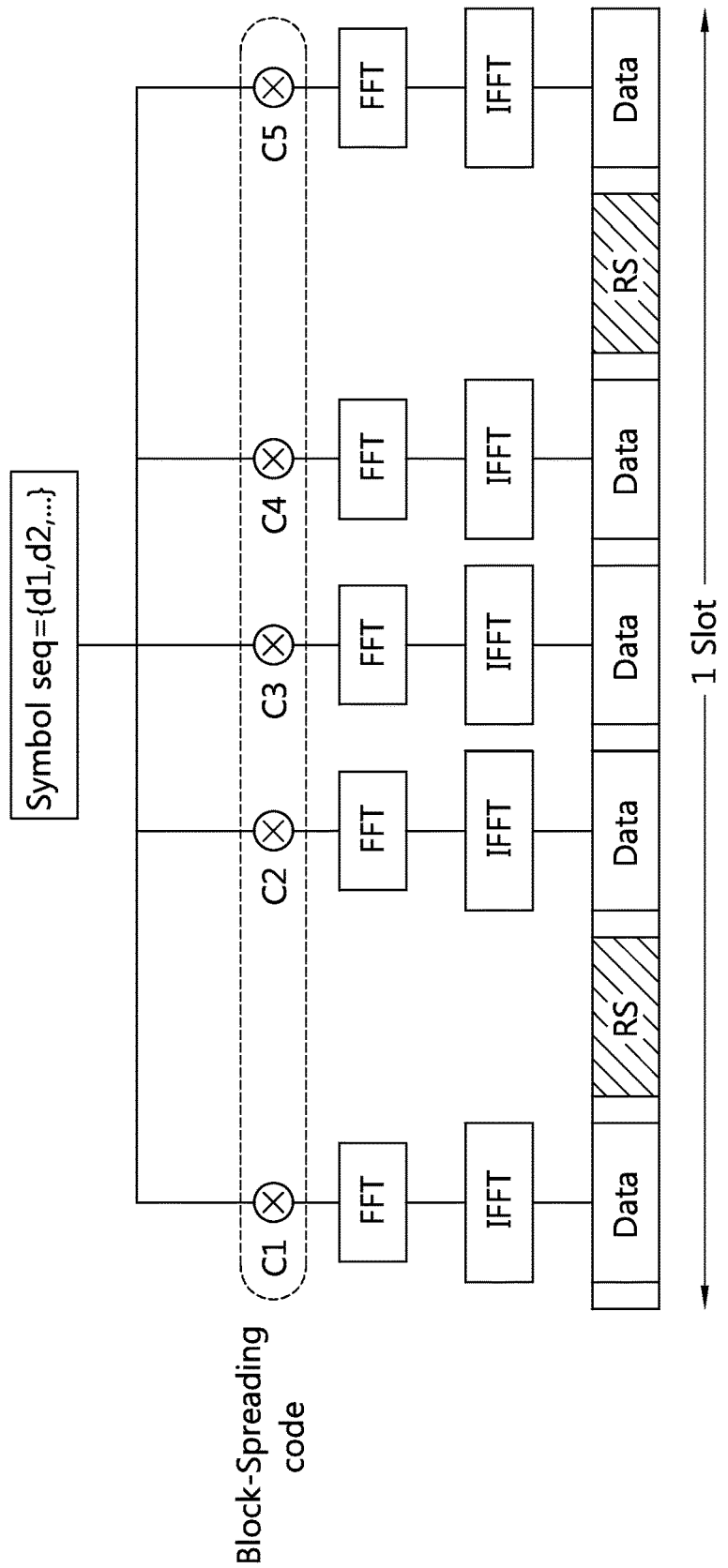
FIG. 8 illustrates the channel structure of PUCCH format 3.

FIG. 8 illustrates the channel structure of PUCCH format 3.

With reference to FIG. 8, the modulation symbol sequence {d1, d2, . . . } is spread in the time domain after the block spreading code is applied. The block spreading code may be an orthogonal cover code (OCC). Here, the modulation symbol sequence may correspond to a sequence of modulation symbols that are obtained from modulation (for example, through QPSK) of ACK/NACK coded bits generated by channel coding (based on RM codes, TBCC, punctured RM codes, and so on) of multi-bit ACK/NACK information bits. The sequence of modulation symbols are transmitted after the sequence goes through FFT (Fast Fourier Transform) and IFFT (Inverse Fast Fourier Transform) and is mapped to the data symbols of the slot.

Although it is assumed in the FIG. 8 that three RS symbols are associated with one slot, two RS symbols are equally allowed and in this case, a block spreading code of length 5 can be utilized.

<Semi-Persistent Scheduling: SPS>

In a wireless communication system, the UE receives scheduling information such as DL grant, UL grant, and the like through the PDCCH; and based on the scheduling information, the UE performs the operation of receiving the PDSCH and transmitting the PUSCH. The DL grant and PDSCH are usually received within the same subframe. For the case of FDD, the PUSCH is transmitted after four subframes from the subframe that receives the UL grant. In addition to such dynamic scheduling, the LTE system also provides semi-persistent scheduling (SPS).

Through a higher layer signal such as RRC (Radio Resource Control), downlink or uplink SPS can inform the UE about which subframes perform semi-persistent transmission (PUSCH)/reception (PDSCH). Parameters provided to the higher layer signal may include, for example, period and an offset value of the subframe.

If the UE receives an activation or release signal of SPS transmission through the PDCCH after recognizing SPS transmission/reception through RRC signaling, it performs or release SPS transmission/reception. In other words, the UE does not perform SPS transmission/reception immediately after SPS is allocated through the RRC signaling; in case the activation or release signal is received through the PDCCH, the UE performs the SPS transmission/reception in the subframe corresponding to the subframe period and offset value allocated through the RRC signaling by applying frequency resources (resource block), modulation according to MSC information, and coding rate according to resource block allocation specified by the PDCCH. If the SPS release signal is received through the PDCCH, the SPS transmission/reception is suspended. The suspended SPS transmission/reception is resumed by using the frequency resources, MSC, and so on specified by the corresponding PDCCH if the PDCCH (SPS re-activation PDCCH) including the SPS activation signal is received.

In what follows, the PDCCH meant for SPS activation is called SPS activation PDCCH while the PDCCH meant for SPS release is called SPS release PDCCH. The UE can validate SPS activation/release PDCCH if the following conditions are all met: 1. CRC parity bits obtained from PDCCH payload are SPS C-RNTI scrambled and 2. the value of a new data indicator field is '0'. Also, if the value of each field included in the PDCCH is configured as shown in the following table, the UE considers downlink control information (DCI) of the corresponding PDCCH as SPS activation or release.

TABLE 5

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |

TABLE 5-continued

| | DCI format 0 | DCI format 1/1A | DCI format 2/2A/2B |
|---|---|---|---|
| Modulation and coding scheme | N/A | MSB is set to '0' | For the enabled transport block: MSB is set to '0' |
| Redundancy version | N/A | set to '00' | For the enabled transport block: set to '00' |

Table 5 describes field values of SPS activation PDCCH for validating SPS activation.

TABLE 6

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 6 describes field values of SPS release PDCCH for validating SPS release.

Referring to SPS, the PDSCH transmitted from the same subframe as the PDCCH indicating SPS activation has the corresponding PDCCH; however, subsequent PDSCH, namely, the PDSCH scheduled later by SPS (it is called SPS PDSCH for the sake of convenience) does not have the corresponding PDCCH. Therefore, in the case of transmitting ACK/NACK for the SPS PDSCH, it is impossible to use the PUCCH resources mapped to the lowest CCE index of the PDCCH. Therefore, in this case, the base station can specify ACK/NACK transmission resources about SPS PDSCH by predetermining a plurality of resources through a higher layer signal such as an RRC message and diverting the TPC field included in the PDCCH specifying SPS activation into ARI (ACK/NACK resource indicator), thus specifying particular resources among the plurality of resources.

<HARQ (Hybrid Automatic Repeat Request)>

An error correction method that can be used when a frame is not received or damaged at the time of communication data between the base station and the UE includes ARQ (Automatic Repeat reQuest) technique and a more advanced technique, HARQ (Hybrid ARQ). In the ARQ technique, a transmitter-side waits for a confirmation message (ACK) to arrive after each frame is transmitted while a receiver-side transmits the confirmation message (ACK) only when the frame is correctly received. In the case of an error in the frame, NACK (negative ACK) message is transmitted and the receive frame containing an error is deleted from a receiver-side buffer. The transmitter-side transmits a subsequent frame when receiving ACK signal but the previous frame is re-transmitted when receiving NACK message.

Different from the ARQ technique, HARQ technique operates such that the receiver-side transmits NACK message to the transmitter-side when a received frame cannot be demodulated; however, a frame already received is stored in a buffer for a predetermined time period and when the frame is re-transmitted, it is combined with pre-received frames, thereby improving a reception success rate.

Today, a more effective HARQ technique than the ARQ technique is in wide use. There are different versions of HARQ technique, which can be divided largely into synchronous HARQ and asynchronous HARQ depending on timing. Also, depending on whether channel conditions are reflected with respect to the amount of resources used at the time of re-transmission, the HARQ technique can be further divided into channel-adaptive technique and channel-non-adaptive technique.

Figure 9:
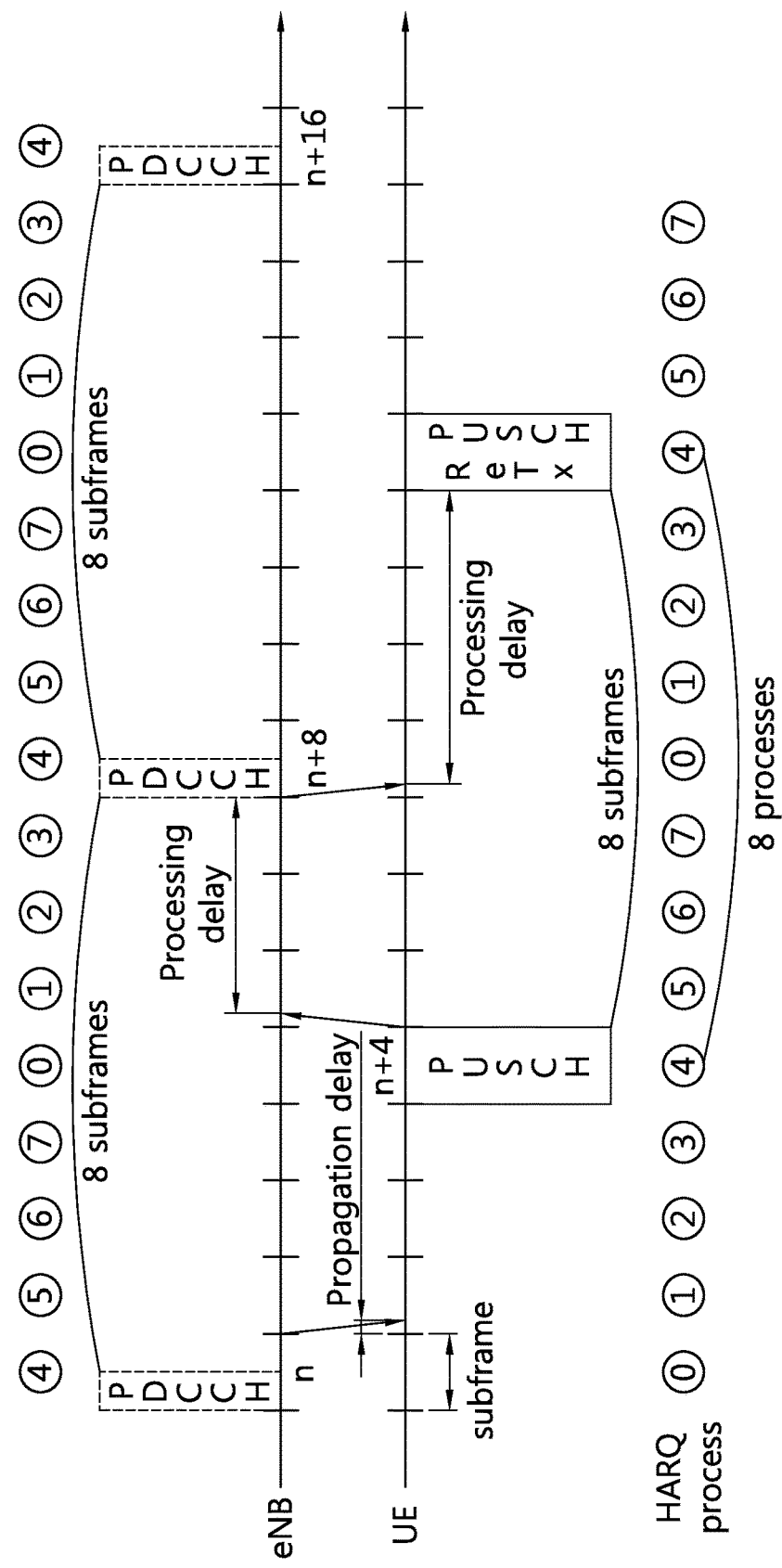
FIG. 9 illustrates synchronization HARQ.

FIG. 9 illustrates synchronization HARQ.

In the case of synchronous HARQ, when the initial transmission fails, subsequent re-transmission is carried out by the timing determined by the system. In other words, suppose re-transmission is carried out at every eighth time unit (subframe) after the initial transmission. In this case, since the base station and the UE are already aware of this agreement, it is not necessary to additionally notify of this timing. However, if a data transmitter-side has received the NACK message, data are re-transmitted at every eighth time unit before the ACK message is received.

On the other hand, in the case of asynchronous HARQ, re-transmission timing can be newly scheduled or carried out through additional signaling. The timing at which re-transmission of data failed previously to be transmitted is varied by various factors such as channel conditions and the like.

In the case of channel-non-adaptive HARQ, data modulation at the time of re-transmission, the number of resource blocks, coding method, and the like are determined as in the initial transmission, whereas they are varied according to channel conditions in the case of channel-adaptive HARQ.

For example, the channel-non-adaptive HARQ operates such that if a transmitter-side transmits data by using six resource blocks at the initial transmission, the same six resource blocks are used for subsequent re-transmission.

On the other hand, in the case of channel-adaptive HARQ, even if data transmission is carried out by using six resource blocks at the initial transmission, larger or smaller than six resource blocks are used for subsequent data re-transmission depending on channel conditions.

According to the above classification, four different kinds of HARQ combinations are possible; however, popular combinations include a combination of asynchronous and channel-adaptive HARQ and a combination of synchronous and channel-non-adaptive HARQ. The combination of asynchronous and channel-adaptive HARQ adjusts re-transmission timing and the amount of resources used adaptively depending on channel conditions, thereby maximizing re-transmission efficiency; however, this combination is not considered for uplink transmission in usual cases since overhead becomes large. Meanwhile, for the combination of synchronous and channel-non-adaptive HARQ, re-transmission timing and resource allocation are defined within the system and therefore, overhead is nearly generated; however, when the combination is used for those channels suffering a severe change, re-transmission efficiency significantly degraded.

In the recent 3GPP LTE system, in the case of downlink transmission, asynchronous HARQ is employed while synchronous HARQ is employed for uplink transmission.

Meanwhile, to give a description with respect to downlink transmission, a time delay is generated as shown in FIG. 9 after data is scheduled and transmitted until ACK/NACK signal is received from the UE and the next data is again transmitted. This time delay is caused by transmission delay of the corresponding channel and the time required for data decoding and encoding. For data transmission not suffering such transmission gap during the delay period, a method for transmitting data by using an independent HARQ process is employed.

For example, if the minimum period between current data transmission and the next one occupies 8 subframes, data transmission can be carried out seamlessly by incorporating 8 independent processes. In the LTE FDD, a maximum of 8 HARQ processes can be allocated if the FDD does not operate in MIMO scheme.

<Carrier Aggregation (CA)>

In the following, a carrier aggregation system is described.

Figure 10:
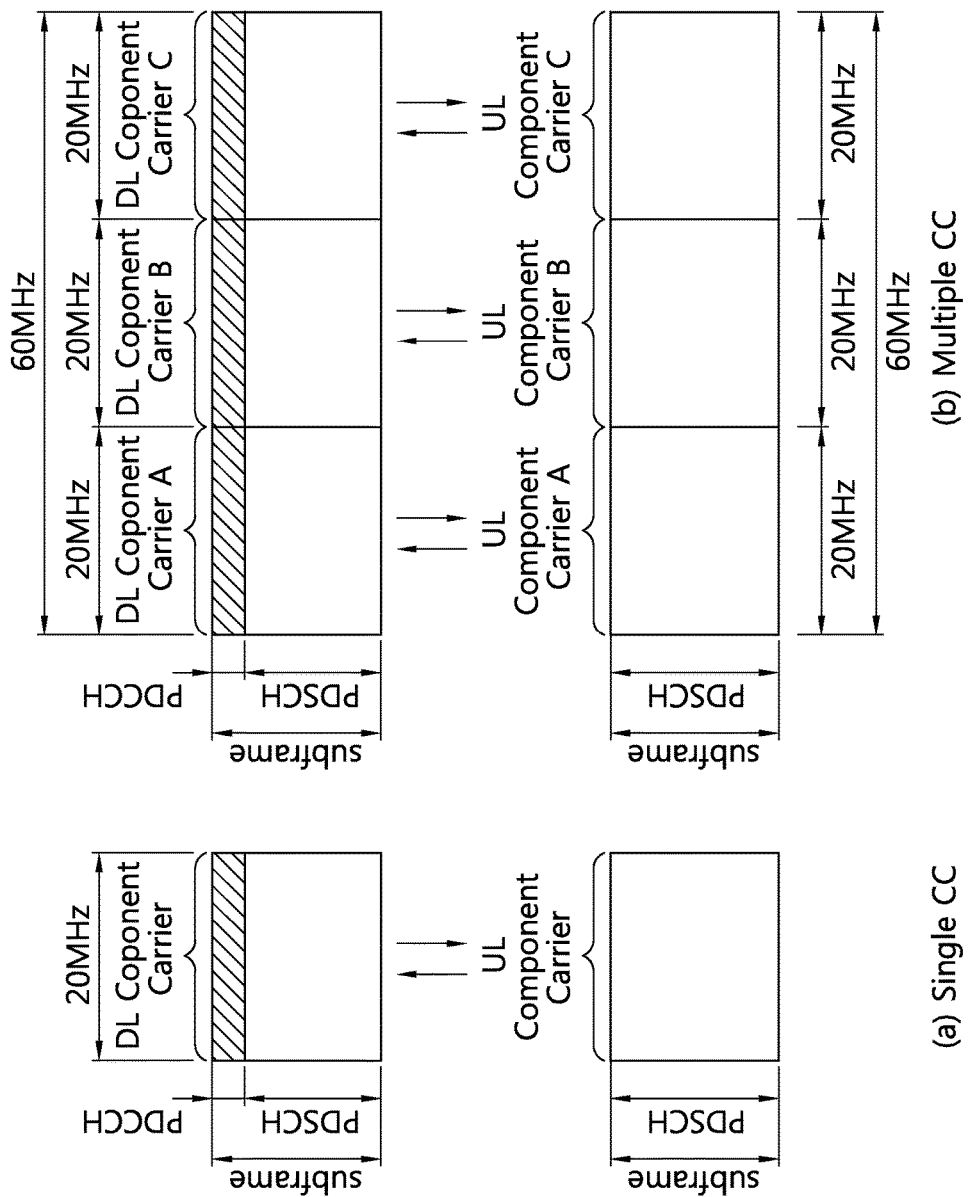
FIG. 10 is an example of comparing the existing single carrier system with a carrier aggregation system.

FIG. 10 is an example of comparing the existing single carrier system with a carrier aggregation system.

With reference to FIG. 10, a single carrier system supports the UE with only a single carrier for uplink and downlink transmission. Bandwidth of a carrier may vary; however, the carrier allocated to the UE is only one. On the other hand, in the carrier aggregation (CA) system, a plurality of component carrier waves (DL CC A to C, UL CC A to C) can be allocated to the UE. A component carrier (CC) refers to a carrier wave used in a carrier aggregation system and it is called a carrier wave for short. For example, to allocate 60 MHz of bandwidth for the UE, three component carriers of 20 MHz can be allocated.

Carrier aggregation systems can be categorized into contiguous carrier aggregation systems where aggregated carrier waves are contiguous to each other and non-contiguous carrier aggregation systems where aggregated carrier waves are separated from each other. In what follows, a carrier aggregation system should be understood to include both of the cases where component carrier waves are contiguous and non-contiguous.

When one or more component carriers are aggregated, the component carriers may use the same bandwidth meant for the existing systems to ensure backward compatibility therewith. For example, the 3GPP LTE system support bandwidth of 1.4 MHz, 3 MHz, 5 MHz, 10 MHz, 15 MHz, and 20 MHz while the 3GPP LTE-A system can construct broad bandwidth of more than 20 MHz by using the bandwidth of the 3GPP LTE system only. Likewise, broad bandwidth can also be constructed by defining new bandwidth instead of utilizing the bandwidth of the existing systems.

The system frequency band of a wireless communication system can be characterized by a plurality of carrier frequencies. Here, carrier frequency implies center frequency of a cell. In what follows, a cell may denote downlink frequency resources and uplink frequency resources. Similarly, a cell may denote a combination of downlink frequency resources and optional uplink frequency resources. Also, in general, if carrier aggregation is not taken into account, a single cell can always be defined by a pair of uplink and downlink frequency resources.

In order for packet data to be transmitted and received through a particular cell, the UE first has to complete configuration of the particular cell. At this point, configuration refers to a state where system information required for data transmission and reception to and from the corresponding cell has been completed. For example, configuration can include the overall procedure of receiving common physical layer parameters required for data transmission and reception; MAC (Media Access Control) layer parameters; or parameters required for particular operation in the RRC layer. A configuration-completed cell is in a state in which immediate transmission and reception of packets can be carried out as soon as the cell receives the information indicating that packet data can be transmitted.

A cell in the configuration-completed state may stay in an activation or deactivation state. Here, the activation refers to a state in which data is being transmitted or received; or a ready state for data transmission and reception. An UE can monitor or receive the control channel (PDCCH) and data channel (PDSCH) of an activated cell in order to check resources (which can be frequency, time, etc.) allocated thereto.

Deactivation refers to a state in which traffic data cannot be transmitted or received but measurement or transmission/reception of minimum information are possible. An UE can receive system information (SI) required for receiving packets from a deactivated cell. However, the UE does not monitor or receive the control channel (PDCCH) and data channel (PDSCH) of a deactivated cell in order to check resources (which can be frequency, time, etc.) allocated thereto.

A cell can be classified into a primary cell, a secondary cell, and a serving cell.

The primary cell means a cell that operates in a primary frequency and more particularly, a cell in which the UE performs an initial connection establishment procedure or a connection re-establishment procedure with the base station; or a cell indicated as a primary cell during a handover process.

The secondary cell means a cell that operates in a secondary frequency, which is configured once RRC connection is established and used to provide additional radio resources.

The serving cell is formed by a primary cell in the case of an UE in which carrier aggregation is not configure or for which carrier aggregation cannot be provided. If carrier aggregation has been configured for the UE, the term 'serving cell' is used to indicate a cell associated with the UE and can be comprised of multiple cells. One serving cell can comprise a single downlink component carrier or a pair of (downlink component carrier, uplink component carrier). A plurality of serving cells can be comprised of a primary cell and a set of one or multiple secondary cells from among the whole secondary cells.

A primary component carrier (PCC) means a component carrier (CC) corresponding to the primary cell. A PCC is a CC through which an UE forms connection or RRC connection with a base station at the early stage from among CCs. The PCC is a special kind of CC that is responsible for connection or RRC connection for signaling regarding a plurality of CCs and manages UE context which is connection information related to the UE. Furthermore, the PCC is always in the activation state when it is in RRC connected mode after establishing connection with the UE. A downlink component carrier corresponding to the primary cell is called a downlink primary component carrier (DL PCC) while an uplink component carrier corresponding to the primary cell is called a uplink primary component carrier (UL PCC).

A secondary component carrier (SCC) means a CC corresponding to a secondary cell. That is, an SCC is a CC allocated to an UE in addition to the PCC, which is an extended carrier for additional resource allocation by the UE in addition to the PCC. A state defined for the SCC can be divided into activation or deactivation state. A downlink component carrier corresponding to a secondary cell is called a downlink secondary component carrier (DL SCC)

while an uplink component carrier corresponding to a secondary cell is called an uplink Secondary Component Carrier (UL SCC).

The primary and the secondary cell have the following characteristics.

First, a primary cell is used to transmit a PUCCH. Second, the primary cell is always activated, whereas a secondary cell is a carrier that is activated or deactivated according to specific conditions. Third, when the primary cell experiences a radio link failure (hereinafter it is referred to as an RLF), RRC re-establishment is triggered. Fourth, the primary cell can be changed by a change of security key or by a handover procedure that is accompanied by a random access channel (RACH) procedure. Fifth, non-access stratum (NAS) information is received through the primary cell. Sixth, the primary cell is always formed of a pair of DL PCC and UL PCC. Seventh, a different CC can be configured as the primary cell for each UE. Eighth, the primary cell can be replaced only through handover or cell selection/re-selection procedure. In adding a new secondary cell, RRC signaling can be used to transmit system information about a dedicated secondary cell.

A downlink component carrier can form one serving cell or a downlink component carrier and an uplink component carrier can form one serving cell through connection establishment between each other. However, a serving cell is not formed of only one uplink component carrier.

The activation/deactivation of a component carrier has the same concept as the activation/deactivation of a serving cell. For example, assuming that a serving cell1 is formed of a DL CC1, activation of the serving cell1 indicates activation of the DL CC1. On the other hand, if it is assumed that a serving cell2 is constructed through connection establishment between a DL CC2 and an UL CC2, activation of the serving cell2 indicates activation of the DL CC2 and the UL CC2. In this sense, each CC can be regarded to correspond to a serving cell.

The number of CCs that are aggregated between downlink and uplink can be differently set. A case where the number of aggregated DL CCs is the same as the number of aggregated UL CCs is called symmetric aggregation while a case where the number of aggregated DL CCs is different from the number of aggregated UL CCs is called asymmetric aggregation. Furthermore, the CCs can have different sizes (i.e., bandwidth). For example, assuming that 5 CCs are used to form bandwidth of 70 MHz, the band can be configured by using 5 MHz CC (carrier #0), 20 MHz CC (carrier #1), 20 MHz CC (carrier #2), 20 MHz CC (carrier #3), and 5 MHz CC (carrier #4).

As described above, unlike the single carrier system, a carrier aggregation system can support a plurality of component carriers (CCs), that is, a plurality of serving cells.

A carrier aggregation system can support cross-carrier scheduling. Cross-carrier scheduling is a scheduling method capable of performing resource allocation of a PDSCH transmitted through a different CC through a PDCCH transmitted through a particular CC and/or resource allocation of a PUSCH transmitted through a different CC other than CCs that is basically linked to the particular. That is, the PDCCH and the PDSCH can be transmitted through different DL CCs and the PUSCH can be transmitted through a different UL CC other than the UL CC that is linked to the DL CC on which a PDCCH including an UL grant has been transmitted. As described above, an system supporting cross-carrier scheduling requires a carrier indicator for informing through which DL CC/UL CC the PDSCH/PUSCH that receives control information from the PDCCH is transmitted. In the following, a field including this carrier indicator is called a carrier indicator field (CIF).

A carrier aggregation system which supports cross-carrier scheduling can include a CIF in the conventional downlink control information (DCI) format. In the system which supports cross-carrier scheduling, for example, LTE-A system, three bits can be extended because the CIF is added to the existing DCI format (i.e., DCI format used in the LTE system). The PDCCH structure can reuse the existing coding method and resource allocation method (i.e., CCE-based resource mapping).

The base station (BS) can configure a PDCCH monitoring DL CC set. The PDCCH monitoring DL CC set includes part of the whole aggregated DL CCs. When cross-carrier scheduling is configured, the UE performs PDCCH monitoring/decoding only on DL CCs that are included in the PDCCH monitoring DL CC set. In other words, the BS transmits the PDCCH for PDSCH/PUSCH to be scheduled only through DL CCs that are included in the PDCCH monitoring DL CC set. The PDCCH monitoring DL CC set can be configured in a UE-specific, UE group-specific or cell-specific manner.

In what follows, ACK/NACK transmission is described.

1. ACK/NACK Feedback Procedure of UE in FDD Mode

For the case of an UE in FDD mode and transmitting ACK/NACK by using the PUCCH format 1b or PUCCH format 3, the UE determines the number of ACK/NACK bits based on the number of configured serving cells and downlink transmission mode of each configured serving cell. For example, the number of ACK/NACK bits can be determined by using ACK/NACK of two bits for the case of a serving cell in downlink transmission mode supporting a maximum of two transmission blocks while ACK/NACK of one bit is used for the other cases.

If two serving cells are allocated to an UE supporting up to two serving cells of frame structure type 1 (FDD), the UE transmits ACK/NACK by using the PUCCH format 1b that utilizes channel selection.

In case two or more serving cells are allocated to the UE supporting aggregation of three or more serving cells of frame structure type 1 (FDD), the UE transmits ACK/NACK by using the PUCCH format 1b or PUCCH format 3 that utilizes channel selection; and which one of the two to utilize is determined by the higher layer. The PUCCH format 1b that utilizes channel selection will be described later.

1.1. The Procedure of ACK/NACK Transmission in Case One Serving Cell is Allocated to the UE in FDD Mode ACK/NACK transmission through two antenna ports (which are denoted by p0 and p1) can be supported in the PUCCH format 1a/1b. In other words, transmit diversity can be supported. Suppose a subframe transmitting ACK/NACK is subframe n.

1) In case the PDCCH is detected in the subframe n−4 and the PDSCH specified by the PDCCH or downlink SPS release PDCCH is received, the UE transmits ACK/NACK at subframe n with respect to the antenna port p0 by using the PUCCH resources determined by $n_{CCE}+N^{(1)}_{PUCCH}$. $n_{CCE}$ is the index of the first CCE (the CCE having the lowest index) used for transmission of DCI (that is, allocation of downlink resources used for receiving downlink data corresponding to ACK/NACK signal) of the corresponding PDCCH and $N^{(1)}_{PUCCH}$ is a parameter notified to the UE by the base station by using a higher layer message. In order to perform two antenna port transmission, PUCCH resources, which are determined by $n_{CCE}+1+N^{(1)}_{PUCCH}$, can be used with respect to the antenna port p1. In the sense that orthogonal resources are used for two antenna ports, such transmit diversity (TxD) can be called SORTD.

2) In case non-existent PDSCH is received in the subframe n−4 of the primary cell by the corresponding PDCCH, the PUCCH resources are determined by higher layer configuration and the following table.

TABLE 7

| Value of 'TPC command for PUCCH' | PUCCH resource value($n^{(1,\tilde{p})}_{PUCCH}$) |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

For the UE configured for two antenna port transmission, two PUCCH resources are mapped to the individual PUCCH resource values in the table 7. For the other cases, each PUCCH resource value of table 7 is mapped to single PUCCH resources.

1.2. The Procedure of ACK/NACK Feedback of the UE to which Two or More Serving Cells are Allocated in FDD Mode An UE to which two or more serving cells are allocated provides ACK/NACK as feedback by using the PUCCH format 1b or PUCCH format 3. The PUCCH format 3 supports two antenna port transmission. The prior art does not support two antenna port transmission for the case of PUCCH format 1b.

When PUCCH format 3 is configured, 1) In case the PDSCH specified by detection of the corresponding PDCCH is received by subframe n−4 of the primary cell or downlink SPS release PDCCH is received by subframe n−4, ACK/NACK is transmitted by using PUCCH resources determined by $n_{CCE}+N^{(1)}_{PUCCH}$. In case two antenna port transmission is chosen for the PUCCH format 1a/1b, two PUCCH resources determined by $n_{CCE}+N^{(1)}_{PUCCH}$ (antenna port p0) and $n_{CCE}+1+N^{(1)}_{PUCCH}$ (antenna port p1).

2) In case PDSCH (for example, a PDSCH except for the PDSCHs belonging to the same subframe as SPS activation PDCCH among those PDSCHs scheduled by SPS) which does not have the corresponding PDCCH is received by subframe n−4 of the primary cell, the UE can transmit ACK/NACK by using the PUCCH format 1a/1b; at this time, the PUCCH resources are determined by higher layer configuration and table 7. Also, in case two antenna port transmission is chosen for the PUCCH format 1a/1b, two PUCCH resources are mapped to each value of table 7 and mapped resources are used.

3) In case PDSCH specified by detection of the corresponding PDCCH is received by subframe n−4 of the secondary cell, the UE can transmit ACK/NACK by using the PUCCH format 3. At this time, the employed PUCCH resources are single resources determined by the value of TPC field of the corresponding PDCCH among four resources configured by the higher layer. The relationship between TPC field values and resources determined is shown in the following table.

TABLE 8

| Value of 'TPC command for PUCCH' | PUCCH resurce value($n_{PUCCH}^{(3,\tilde{p})}$) |
|---|---|
| '00' | The 1st PUCCH resource value configured by the higher layers |
| '01' | The $2^{nd}$ PUCCH resource value configured by the higher layers |
| '10' | The $3^{rd}$ PUCCH resource value configured by the higher layers |
| '11' | The $4^{th}$ PUCCH resource value configured by the higher layers |

In case two antenna port transmission is chosen for the PUCCH format 3, two PUCCH resources are mapped to each PUCCH value in the Table 8 and the two PUCCH resources are used for two antenna port transmission. At this time, the UE assumes that each of DCI formats of the corresponding secondary PDCCH allocation transmits the same PUCCH resource value in the given subframe.

2. ACK/NACK Feedback Procedure of UE in TDD Mode

Different from FDD (Frequency Division Duplex), in the TDD mode, DL subframe and UL subframe belong to one radio frame. In most cases, the number of UL subframes is smaller than the number of DL subframes. Therefore, in order to deal with the situation where UL subframes for transmitting ACK/NACK signal are not enough, TDD mode supports transmission of a plurality of ACK/NACK signals associated with a plurality of DL transmission blocks through one UL subframe.

In the TDD mode, for those UEs not supporting aggregation of two or more serving cells, two ACK/NACK modes comprising bundling and channel selection are supported.

First, bundling transmits ACK if PDSCH (namely, downlink transmission blocks) received by the UE are all successfully decoded whereas NACK is transmitted otherwise, which is called AND operation. However, bundling is not limited to the AND operation, including various operations of compressing ACK/NACK bits corresponding to a plurality of transmission block (or codeword). For example, bundling can be used for showing a value counting the number of ACKs (or NACKs) or the number of contiguous ACKs.

Second, channel selection is also called ACK/NACK multiplexing. An UE selects single PUCCH resources from among a plurality of PUCCH resources and transmits ACK/NACK by transmitting bits (or modulation symbols) through the PUCCH resources. In other words, channel selection is such kind of technique which shows an actual state of ACK/NACK by combination of resources selected from among a plurality of resources and bits (modulation symbols) transmitted through the selected resources.

The following table shows DL subframe n−k associated with UL subframe n according to UL-DL configuration in the 3GPP LTE system, where k∈K and M represents the number of elements in the set K.

TABLE 9

| UL-DL Configuration | \multicolumn{10}{c}{Subframe n} |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Suppose M DL subframes are associated with UL subframe n and M=3. Since three PDCCHs can be received from the three DL subframes, the UE can obtain three PUCCH resources ($n^{(1)}_{PUCCH,0}$, $n^{(1)}_{PUCCH,1}$, $n^{(1)}_{PUCCH,2}$). In the TDD mode, examples of channel selection can be as follows.

TABLE 10

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | \multicolumn{2}{c}{No transmission} |

HARQ-ACK(i) denotes ACK/NACK for i-th downlink subframe among M downlink subframes. DTX (Discontinuous Transmission) indicates inability of receiving DL transmission block or detecting the corresponding PDCCH. According to Table 10, there are three PUCCH resources ($n^{(1)}_{PUCCH,0}$, $n^{(1)}_{PUCCH,1}$, $n^{(1)}_{PUCCH,2}$) and b(0) and b(1) are two bits transmitted through PUCCH.

For example, if the UE successfully receives all of the three DL transmission blocks through three DL subframes, the UE performs QPSK modulation to bit (1, 1) by using $n^{(1)}_{PUCCH,2}$ and transmits the modulated bit (1, 1) through the PUCCH. In case the UE fails to decode DL transmission block for the first (i=0) DL subframe and succeeds to decode the DL transmission block for the remaining subframes, the UE transmits bit (1, 0) through PUCCH by using $n^{(1)}_{PUCCH,2}$.

In channel selection, if there is at least one ACK, NACK and DTX are coupled with each other. This is because it is not possible to represent all of the ACK/NACK states by using combination of reserved PUCCH resources and QPSK symbols. However, if no ACK is available, DTX is decoupled from NACK.

The conventional PUCCH format 1b can transmit only ACK/NACK of two bits. However, PUCCH format 1b employing channel selection links combination of allocated PUCCH resources and modulation symbol (two bits) with a plurality of ACK/NACK states, thereby being able to represent much more ACK/NACK states.

In the TDD mode, if UL-DL configuration is 5 and the UE does not support aggregation of two or more serving cells, only bundling is supported.

In the TDD mode, if an UE supports aggregation of two or more serving cells and two or more serving cells are allocated thereto, the UE transmits ACK/NACK by using either PUCCH format 1b with channel selection or PUCCH format 3 according to higher layer configuration.

Also, in the TDD mode, if an UE supporting aggregation of two or more serving cells is configured to use bundling by a higher layer signal and one serving cell is allocated to the UE, the UE can transmit ACK/NACK by using either PUCCH format 1b with channel selection or PUCCH format 3 according to the higher layer configuration.

Also, in the case of PUCCH format 1b employing channel selection, a table similar to table 10 can be defined for the FDD mode and ACK/NACK can be transmitted according to the definition.

<PUCCH Transmission Power Control>

Assuming that transmission power of PUCCH transmitted from subframe i is $P_{PUCCH}(i)$, $P_{PUCCH}(i)$ can be determined by the following equation.

$$P_{PUCCH}(i) = \min\begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T \times D}(F') + g(i) \end{cases} \quad \text{[Eq. 3]}$$

In the Eq. 3, $P_{CMAX,c}(i)$ corresponds to the maximum transmission power configured for the UE at subframe i of serving cell c, which is determined by the UE based on a parameter received from the base station and UE-specific parameters.

$P_{0\_PUCCH}$ is a value given by the higher layer and $PL_c$ is a value representing path loss. g(i) denotes a current PUCCH power control adjustment state.

$\Delta_{F\_PUCCH}(F)$ is provided by the higher layer and its value corresponds to PUCCH format (F).

$h(n_{CQI}, n_{HARQ}, n_{SR})$ is a value dependent on PUCCH format, where $n_{CQI}$ corresponds to the number of CQI information bits and $n_{SR}$ is 1 or 0 if SR is set in the subframe i. In the FDD mode, $n_{HARQ}$ is a total sum of the number of transmission blocks received by subframe n−4 (where it is assumed that the subframe transmitting ACK/NACK is subframe n) of each configured cell or SPS release PDCCH/EPDCCH when two or more serving cells are allocated to the UE or one serving cell is allocated and transmission is carried out by using PUCCH format 3. In the TDD mode, $n_{HARQ}$ can be determined from individual configured cells based on the number of transmission blocks received by subframe n−k corresponding to subframe n or a total sum of DL SPS release PDCCH. Similarly, in the case of TDD mode, $n_{HARQ}$ can be determined based on PDCCH/EPDCCH received by subframe n−k corresponding to subframe n of each configured cell or a total number of PDSCHs which does not have the corresponding PDCCH/EPDCCH.

Except for the above cases, $n_{HARQ}$ denotes the number of HARQ bits transmitted from subframe i.

$\Delta_{TxD}(F')$ is a value assigned by the higher layer (for example, RRC message) when the UE is configured to transmit PUCCH by the higher layer through two antenna ports. $\Delta_{TxD}(F')$ provides a power offset value for each PUCCH format when TxD is used for PUCCH transmission.

In the conventional PUCCH power control, whether to apply the power offset for TxD of $\Delta_{TxD}(F')$ was determined for each PUCCH format. Since interference environment is different for each PUCCH format and SINR gain can be varied at the time of applying TxD, the power offset value at the time of applying TxD was determined differently for each PUCCH format.

The following table is one example of the conventional RRC message for determining $\Delta_{TxD}(F')$.

TABLE 11

```
DeltaTxD-OffsetListPUCCH-r10 ::=        SEQUENCE {
    deltaTxD-OffsetPUCCH-Format1-r10        ENUMERATED {dB0,
                                            dB-2},
    deltaTxD-OffsetPUCCH-Format1a1b-r10     ENUMERATED {dB0,
                                            dB-2},
    deltaTxD-OffsetPUCCH-Format22a2b-r10    ENUMERATED {dB0,
                                            dB-2},
    deltaTxD-OffsetPUCCH-Format3-r10        ENUMERATED {dB0,
                                            dB-2},
    ...
}
```

In the Table 11, dB0 corresponds to 0 dB and dB−2 corresponds to −2 dB.

As shown in Table 11, $\Delta_{TxD}(F')$ value is dB0 or dB−2 for each PUCCH format according to whether TxD is used or not; TxD is not employed for channel selection. Therefore, $\Delta_{TxD}(F')$ is not defined for channel selection.

Meanwhile, for emerging wireless communication systems, TxD can be applied to the PUCCH format 1b which employs channel selection. In this case, it is not preferable to use $\Delta_{TxD}(F')$ values (dB0, dB−2) as shown in Table 11. It is because hypothesis based on which ACK/NACK is detected is changed for each of the case where ACK/NACK is transmitted by using the PUCCH format 1a/1b and the case where ACK/NACK is transmitted by using channel selection (for example, PUCCH format 1b utilizing channel selection); and thus SINR (Signal to Interference plus Noise Ratio) required for detecting ACK/NACK can be varied.

Therefore, the present invention can further set up the $\Delta_{TxD}(F')$ value for the case where transmission technique for ACK/NACK transmission is changed in addition to setting up the $\Delta_{TxD}(F')$ value according to whether TxD is applied or not for each of PUCCH formats.

For example, $\Delta_{TxD}(F')$, which is determined according to whether TxD is applied when ACK/NACK is transmitted by using the PUCCH format 1b with channel selection, can be signaled to an UE. In this case, RRC message can include parameters as shown in Table 12 below.

TABLE 12

```
DeltaTxD-OffsetListPUCCH-r11 ::=         SEQUENCE {
    deltaTxD-OffsetPUCCH-Format1-r10         ENUMERATED {dB0,
                                             dB-2},
    deltaTxD-OffsetPUCCH-Format1a1b-r10      ENUMERATED {dB0,
                                             dB-2},
    deltaTxD-OffsetPUCCH-Format22a2b-r10     ENUMERATED {dB0,
                                             dB-2},
    deltaTxD- OffsetPUCCH-Format3-r10        ENUMERATED {dB0,
                                             dB-2},
    deltaTxD-OffsetPUCCH-ChannelSelection-r11 ENUMERATED
        {dB0, dB-1},
    ...
}
```

In other words, different from Table 11, as shown in Table 12, $\Delta_{TxD}(F')$ value dependent on application of TxD is signaled to the UE differently for each PUCCH format with channel selection.

The following Table 13 is one example of RRC message indicating PUCCH TxD set-up for the case where PUCCH format 1b with channel selection is configured.

TABLE 13

```
-- ASN1START
PUCCH-ConfigCommon ::=   SEQUENCE {
    deltaPUCCH-Shift          ENUMERATED {ds1, ds2, ds3},
    nRB-CQI                   INTEGER (0..98),
    nCS-AN                            INTEGER (0..7),
    n1PUCCH-AN                        INTEGER (0..2047)
}
PUCCH-ConfigDedicated ::=  SEQUENCE {
    ackNackRepetition     CHOICE {
        release                   NULL,
        setup                     SEQUENCE {
            repetitionFactor      ENUMERATED {n2, n4, n6, spare1},
            n1PUCCH-AN-Rep    INTEGER (0..2047)
        }
    },
    tdd-AckNackFeedbackMode       ENUMERATED {bundling, multiplexing} OPTIONAL   -- Cond TDD
}
PUCCH-ConfigDedicated-v11 ::=       SEQUENCE {
    pucch-Format-r10                CHOICE {
        format3-r10                 SEQUENCE {
            n3PUCCH-AN-List-r10     SEQUENCE (SIZE (1..4)) OF INTEGER (0..549) OPTIONAL,
                -- Need ON
                twoAntennaPortActivatedPUCCH-Format3-r-10            CHOICE {
                    release             NULL,
                    setup               SEQUENCE {
                        n3PUCCH-AN-ListPl-r10     SEQUENCE (SIZE (1..4)) OF INTEGER (0..549)
                    }
                }
```

TABLE 13-continued

```
                                              OPTIONAL          -- Need ON
    },
        channelSelection-r11        SEQUENCE {
            n1PUCCH-AN-CS-r11              CHOICE {
                release              NULL,
                setup                SEQUENCE {
                    n1PUCCH-AN-CS-List-r10    SEQUENCE (SIZE (1..2)) OF N1PUCCH-AN-CS-r10
                }
            }
            twoAntennaPortActivatedPUCCH-ChannelSelection-r11    CHOICE{
        release                      NULL,
        setup                        SEQUENCE {
            n1PUCCH-AN-CS-ListP1-r11   SEQUENCE (SIZE (1..4)) OF N1PUCCH-AN-CS-r10
            }
        }
                                              OPTIONAL      -- Need ON
                                              OPTIONAL      -- Need ON
        }
    }
                                              OPTIONAL,     -- Need OR
    twoAntennaPortActivatedPUCCH-Format1a1b-r10   ENUMERATED {true}  OPTIONAL, -- Need OR
    simultaneousPUCCH-PUSCH-r10        ENUMERATED {true}    OPTIONAL, -- Need OR
    n1 PUCCH-AN-RepP1-r10              INTEGER (0..2047)    OPTIONAL -- Need OR
}
N1PUCCH-AN-CS-r10       ::= SEQUENCE (SIZE (1..4)) OF INTEGER (0..2047)
-- ASN1STOP
```

Figure 11:
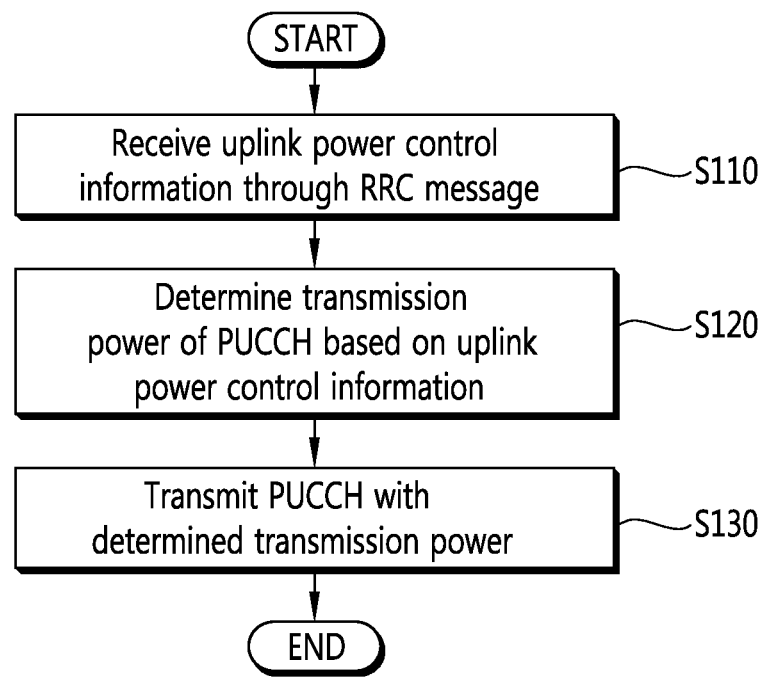
FIG. 11 illustrates a method for determining transmission power of an uplink control channel according to one embodiment of the present invention.

FIG. 11 illustrates a method for determining transmission power of an uplink control channel according to one embodiment of the present invention.

With reference to FIG. 11, the UE receives uplink power control information from the base station S110. The uplink power control information can be received through a higher layer signal such as RRC message and the RRC message can be part of system information.

The uplink power control information can include various parameter values required for determining PUCCH transmission power. Also, the uplink power control information can include the $\Delta_{TxD}(F')$ value determined according to application of TxD at the time of transmitting ACK/NACK by using the PUCCH format 1b with channel selection as shown in Table 12. As described with reference to Table 12, the $\Delta_{TxD}(F')$ value at the time TxD is applied for channel selection can be configured differently from the $\Delta_{TxD}(F')$ value determined according to whether TxD is applied to each PUCCH format to which channel selection is not used.

The UE determines transmission power of PUCCH based on uplink power control information S120 and transmits PUCCH by using the determined transmission power S130.

If only one serving cells is employed in the TDD mode and the number of DL subframes (M) corresponding to UL subframes is 1, the PUCCH format 1a/1b can be used even when the PUCCH format 1b employing channel selection is chosen. Also, The PUCCH format 1a/1b can be used for the case where the number of DL subframes corresponding to ACK/NACK timing of UL subframe is 1 and the other cells is 0 in the aggregation of cells using UL-DL configurations different from each other.

If TxD is applied for the PUCCH format 1b with channel selection while not for the PUCCH format 1a/1b, there will be a difference in terms of PUCCH power control.

One method to resolve the difference is to apply separately the $\Delta_{TxD}(F')$ value according to application of TxD for the PUCCH format.

Also, if TxD is applied to PUCCH format 1b with channel selection, the PUCCH format 1a/1b can be coupled with each other so that TxD can be applied thereto.

Meanwhile, if limited to carrier aggregation, TxD can be configured for the PUCCH format 1b with channel selection.

UL-DL configuration of individual carriers which are used for carrier aggregation can be different from each other; the number of DL subframes $M_c$ corresponding to ACK/NACK of UL subframe can assume 0 in one cell while it can be non-zero for other cells. Moreover, application of TxD for the PUCCH forma 1b with channel selection can be made to be the same as in the TxD configuration of the PUCCH format 1a/1b. If two cells using different UL-DL configurations from each other are aggregated and the respective $M_c$ values are both non-zero, TxD configuration for the PUCCH format 1b with channel selection can be used whereas, if $M_c$ value of either of the cells is zero, TxD configuration for the PUCCH format 1a/1b can be used.

<Configuration of PUCCH TxD According to Carrier Aggregation Capability of UE when PUCCH Format 1b with Channel Selection is Applied>

TxD (SORTD) for PUCCH format 1b with channel selection is usually required for such kind of UEs that support two or more cell aggregation. In case two or more cells are aggregated, PUCCH power control is carried out based on the state of ACK/NACK that may actually occur. For example, according to Eq. 3, PUCCH transmission power control can be determined based on $n_{HARQ}$ and in the case of two or more cell aggregation, $n_{HARQ}$ reflects the state of ACK/NACK that may actually occur. It may be efficient to use SORTD for the sake of transmission reliability at the cost of deferring a plurality of PUCCH resources to use SORTD.

Meanwhile, when only a single cell is configured, $n_{HARQ}$ carries the number of ACK/NACK bits transmitted rather than the ACK/NACK state that may actually occur in the corresponding subframe and PUCCH power control is carried out based on the $n_{HARQ}$. Therefore, actual scheduling is performed infrequently and thus, even if the number of possible ACK/NACK states is small, PUCCH power is always allocated based on the maximum number of ACK/NACK states irrespective of the number of possible ACK/NACK states. If transmission power gain due to TxD and consumption of PUCCH resources due to using TxD are compared against each other, usefulness gained from using TxD may become low in case only one cell is configured.

Taking account of the fact above, TxD (SORTD) function according to the present invention can only be allowed to those UEs capable of aggregating two (or more) cells when PUCCH format 1b with channel selection is employed.

Meanwhile, it is not necessary to prevent the UE supporting the TxD (SORTD) function from utilizing TxD when only one cell is allocated to the UE. This is because there are chances that DL subframes are scheduled in such a way to exhibit the maximum number of ACK/NACK states or the UE capable of carrier aggregation can be made to perform power control according to $n_{HARQ}$ even when only one cell is allocated to the UE.

To summarize, in the PUCCH format 1b with channel selection, TxD (SORTD) is allowed only for those UEs capable of aggregating two or more cells; and if the same UE is allocated with only one cell, TxD is allowed. On the other hand, for those UEs capable of handling only one cell (namely, those UEs which do not support aggregation of two or more cells), TxD (SORTD) may not be allowed in using the PUCCH format 1b with channel selection.

Figure 12:
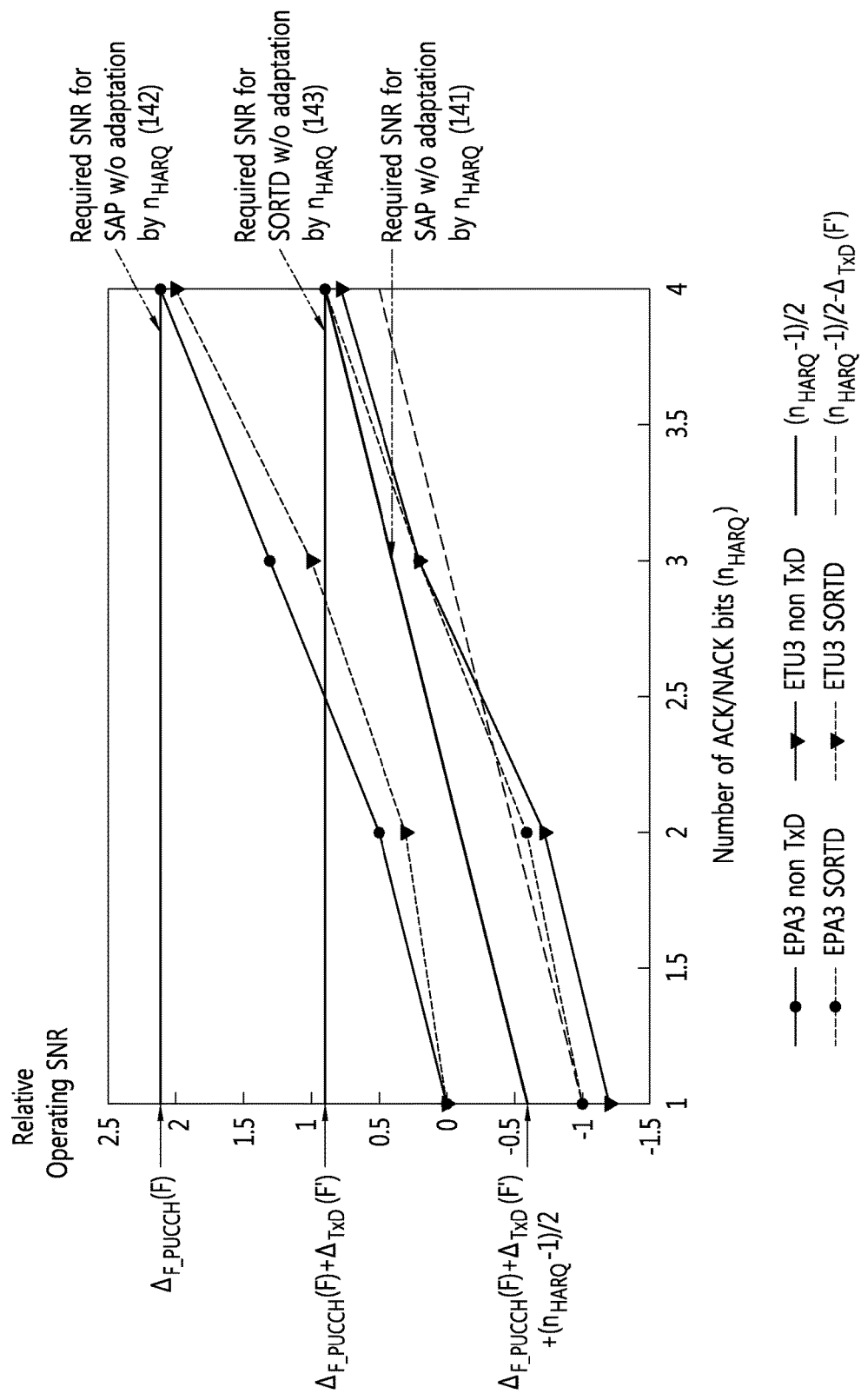
FIG. 12 is an example of PUCCH transmission power required according to the number of ACK/NACK bits.

FIG. 12 is an example of PUCCH transmission power required according to the number of ACK/NACK bits.

With reference to FIG. 12, the best performance is found in the case where $n_{HARQ}$ reflecting the number of actual ACK/NACK states is applied together with TxD 141.

In the case of single antenna port (SAP), a power offset value of amounting to about 2 dB is required 142. And in the case of TxD (SORTD), a power offset value of approximately 1 dB is required 143.

When PUCCH power control is performed according to $n_{HARQ}$, transmission power gain is obtained or not compared with the case where power control based on $n_{HARQ}$ that reflects the number of actual ACK/NACK states is applied while TxD is not utilized for channel selection using a plurality of resources 144 or the case where TxD is applied 143. Therefore, a method for performing power control based on $n_{HARQ}$ that reflects the number of actual ACK/NACK states can achieve performance enhancement more simply than those methods using TxD.

Figure 13:
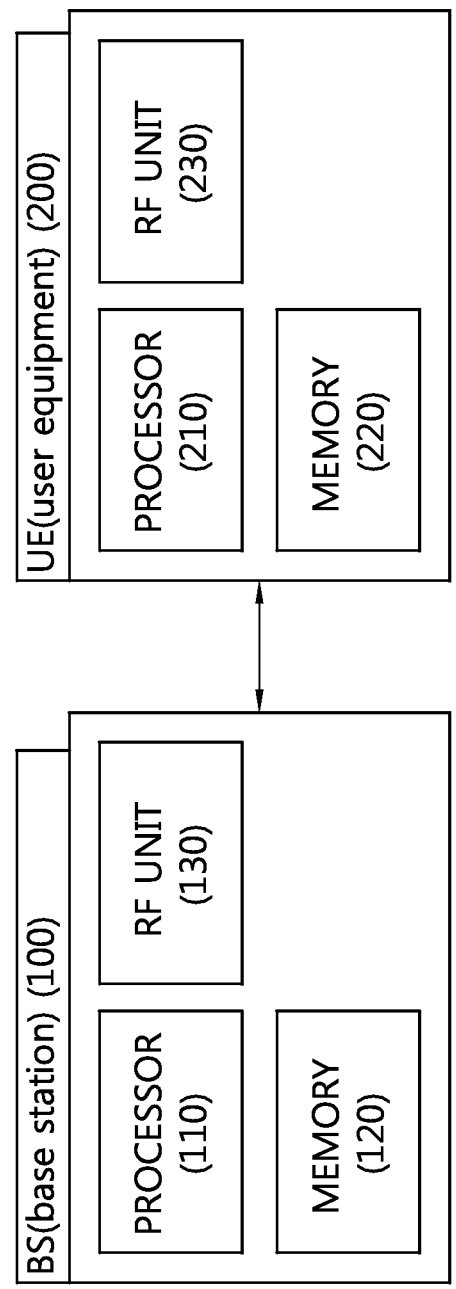
FIG. 13 illustrates the configuration of a base station and an user equipment according to an embodiment of the present invention.

FIG. 13 illustrates the configuration of a base station and an user equipment according to an embodiment of the present invention.

The base station 100 comprises a processor 110, a memory 120, and an RF (radio frequency) unit 130. The processor 110 embodies the proposed functions, processes, and/or methods. The memory 120, being connected to the processor 110, stores various kinds of information for driving the processor 110. The RF unit 130, being connected to the processor 110, transmits and/or received radio signals.

The UE 200 comprises a processor 210, a memory 220, and an RF unit 230. The processor 210 embodies the proposed functions, processes, and/or methods. The memory 220, being connected to the processor 210, stores various kinds of information for driving the processor 210. The RF unit 230, being connected to the processor 210, transmits and/or received radio signals.

The processor 110, 210 may include Application-Specific Integrated Circuits (ASICs), other chipsets, logic circuits, data processors and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When the above-described embodiment is implemented in software, the above-described scheme may be embodied using a module (process or function) that performs the above function. The module may be stored in the memory 120, 220 and executed by the processor 110, 210. The memory 120, 220 may be placed inside or outside the processor 110, 210 and may be connected to the processor 110, 210 using a variety of well-known means.

What is claimed is:

1. A method for controlling transmission power of a physical uplink control channel (PUCCH), performed by a user equipment (UE), in a wireless communication system, the method comprising:

receiving uplink power control information; receiving physical downlink control channels (PDCCHs); receiving physical downlink shared channels (PDSCHs) scheduled by the PDCCHs through at least one serving cell;

determining transmission power for the PUCCH based on the uplink power control information; and transmitting ACK/NACK (acknowledgement/negative-acknowledgement) information for the PDSCHs through the PUCCH at the determined transmission power using two resources, wherein the uplink power control information includes a transmit diversity power offset value determined according to whether the PUCCH is transmitted using transmit diversity and whether the PUCCH is transmitted using a channel selection scheme, wherein a set of candidate values for the transmit diversity offset corresponding to each of a plurality PUCCH formats, none of which use a channel selection scheme, are the same, wherein only a set of candidate values for the transmit diversity power offset corresponding to one of the plurality of PUCCH formats, which uses a channel election scheme, is different from the set of candidate values for the transmit diversity power offset corresponding to each of the remaining PUCCH formats, none of which use a channel selection scheme, wherein a first resource among the two resources is determined based on a lowest control channel element (CCE) index of the PDCCH and a second resource among the two resources is determined based on a 'lowest CCE index of the PDCCH+1', wherein when the UE supports aggregating up to two serving cells and when two serving cells are allocated to the UE, the UE transmits the ACK/NACK information using the channel selection scheme, and wherein when the UE supports aggregating three or more serving cells and when two or more serving cells are allocated to the UE, the UE transmits the ACK/NACK information using the channel selection scheme or PUCCH format 3 based on a higher layer signal.

2. The method of claim 1, wherein the channel selection scheme indicates one of a plurality of ACK (acknowledgement)/NACK (negative acknowledgement) combinations using two bits transmitted through a single PUCCH (Physical Uplink Control Channel) resource selected from a plurality of PUCCH resources.

3. The method of claim 2, wherein the UE supports aggregation of two or more cells.

4. The method of claim 1 further comprising:
transmitting the PUCCH through two antenna ports when transmit diversity is applied.

5. The method of claim 4, wherein the PUCCH is transmitted through each of the two antenna ports using each of two PUCCH resources orthogonal to each other, respectively.

6. The method of claim 1, wherein the uplink power control information is received through an RRC (Radio Resource Control) message.

7. The method of claim 1, further comprising: transmitting the PUCCH using the determined transmission power.

8. A user equipment (UE) comprising:
a transceiver that transmits and receives radio signals; and
a processor operationally connected to the transceiver, wherein the processor is configured to:
receive uplink power control information; receive physical downlink control channels (PDCCHs); receive physical downlink shared channels (PDSCHs) scheduled by the PDCCHs through at least one serving cell;
determine transmission power for a physical uplink control channel (PUCCH) based on the uplink power control information; and transmit ACK/NACK (acknowledgement/negative-acknowledgement) information for the PDSCHs through the PUCCH at the determined transmission power using two resources, wherein the uplink power control information includes a transmit diversity power offset value determined according to whether the PUCCH is transmitted using transmit diversity and whether the PUCCH is transmitted using a channel selection scheme,
wherein a set of candidate values for the transmit diversity offset corresponding to each of a plurality PUCCH formats, none of which use a channel selection scheme, are the same,
wherein only a set of candidate values for the transmit diversity power offset corresponding to one of the plurality of PUCCH formats, which uses a channel election scheme, is different from the set of candidate values for the transmit diversity power offset corresponding to each of the remaining PUCCH formats, none of which use a channel selection scheme,
wherein a first resource among the two resources is determined based on a lowest control channel element (CCE) index of the PDCCH and a second resource among the two resources is determined based on a 'lowest CCE index of the PDCCH+1',
wherein when the UE supports aggregating up to two serving cells and when two serving cells are allocated to the UE, the UE transmits the ACK/NACK information using the channel selection scheme, and
wherein when the UE supports aggregating three or more serving cells and when two or more serving cells are allocated to the UE, the UE transmits the ACK/NACK information using the channel selection scheme or PUCCH format 3 based on a higher layer signal.

9. The UE of claim 8, wherein the channel selection scheme indicates one of a plurality of ACK (acknowledgement)/NACK (negative acknowledgement) combinations using two bits transmitted through a single PUCCH resource selected from a plurality of PUCCH resources.

10. The UE of claim 9, wherein the UE supports aggregation of two or more cells.

11. The UE of claim 8, wherein the processor transmits the PUCCH through two antenna ports when transmit diversity is applied.

12. The UE of claim 11, wherein the PUCCH is transmitted through each of the two antenna ports using each of two PUCCH resources orthogonal to each other, respectively.

13. The UE of claim 8, wherein the uplink power control information is received through an RRC (Radio Resource Control) message.

14. The UE of claim 8, wherein the processor transmits the PUCCH using the determined transmission power.

* * * * *